US012719521B2

(12) United States Patent
Oh et al.

(10) Patent No.: US 12,719,521 B2
(45) Date of Patent: Aug. 25, 2026

(54) RING DEVICE COMPRISING ANTENNA

(71) Applicant: SAMSUNG ELECTRONICS CO., LTD., Suwon-si (KR)

(72) Inventors: Youngjin Oh, Suwon-si (KR); Kyuho Lee, Suwon-si (KR); Yerim Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 18/673,953

(22) Filed: May 24, 2024

(65) Prior Publication Data

US 2025/0080151 A1 Mar. 6, 2025

Related U.S. Application Data

(63) Continuation of application No. PCT/KR2024/006832, filed on May 21, 2024.

(30) Foreign Application Priority Data

Sep. 5, 2023 (KR) ........................ 10-2023-0118016
Oct. 24, 2023 (KR) ........................ 10-2023-0143359

(51) Int. Cl.
*H01Q 1/27* (2006.01)
*H04B 1/3827* (2015.01)
(Continued)

(52) U.S. Cl.
CPC ............. *H04B 1/385* (2013.01); *H01Q 1/273* (2013.01); *H04B 7/0602* (2013.01); *H04B 7/0802* (2013.01); *H04B 2001/3861* (2013.01)

(58) Field of Classification Search
CPC ...... H01Q 1/273; H01Q 21/205; H01Q 3/242; H04B 1/385; H04B 2001/3861; H04B 7/0602; H04B 7/0802
See application file for complete search history.

(56) References Cited

U.S. PATENT DOCUMENTS 6,281,854 B1 8/2001 Ohoka et al.
10,250,063 B2 4/2019 Woo
(Continued)

FOREIGN PATENT DOCUMENTS

CN 105656526 6/2016
CN 110492918 11/2019
(Continued)

OTHER PUBLICATIONS

Search Report and Written Opinion dated Sep. 13, 2024 issued in International Patent Application No. PCT/KR2024/006832.
(Continued)

*Primary Examiner* — Thien M Le
(74) *Attorney, Agent, or Firm* — Nixon & Vanderhye P.C.

(57) ABSTRACT

A ring device includes a printed circuit board with an upper surface, a lower surface opposite the upper surface, and a side surface extending from an edge of the upper surface to an edge of the lower surface. First and second antenna patterns are formed on respective first and second parts of the side surface. At least one sensor is disposed on the printed circuit board, and at least one processor is operatively coupled to the first antenna pattern, the second antenna pattern, and the sensor. The processor is configured to determine an orientation of the ring device using the at least one sensor and control the ring device to transmit and/or receive a radio frequency (RF) signal using any one of the first antenna pattern and the second antenna pattern, based on the determined orientation.

20 Claims, 19 Drawing Sheets

(51) Int. Cl.

| | |
|---|---|
| ***H04B 7/06*** | (2006.01) |
| ***H04B 7/08*** | (2006.01) |

(56) References Cited

U.S. PATENT DOCUMENTS

| | | | | |
|---|---|---|---|---|
| 11,196,151 | B2 | 12/2021 | Ahn et al. | |
| 11,271,290 | B2 | 3/2022 | McLear et al. | |
| 11,829,831 | B1 * | 11/2023 | Ershov | H01Q 1/2208 |
| 11,902,791 | B2 * | 2/2024 | Mars | H04L 63/0861 |
| 11,916,900 | B2 * | 2/2024 | Mars | H04L 63/102 |
| 11,962,096 | B2 | 4/2024 | Choi et al. | |
| 2017/0277990 | A1 | 9/2017 | Tokunaga et al. | |
| 2018/0033919 | A1 * | 2/2018 | Lee | H10H 20/853 |
| 2019/0210067 | A1 * | 7/2019 | Kumar | G06V 10/82 |
| 2020/0266529 | A1 | 8/2020 | Moussakhani | |
| 2021/0193977 | A1 * | 6/2021 | Reykhert | H05K 1/141 |
| 2021/0289897 | A1 | 9/2021 | Hsu | |
| 2022/0305559 | A1 * | 9/2022 | Hart | B29C 64/106 |
| 2023/0101132 | A1 | 3/2023 | Park | |
| 2023/0413440 | A1 * | 12/2023 | Lai | H05K 1/181 |
| 2024/0046505 | A1 * | 2/2024 | Liu | G06V 10/82 |
| 2024/0103605 | A1 * | 3/2024 | Szini | H01Q 21/26 |
| 2025/0213190 | A1 * | 7/2025 | Baac | A61B 5/0205 |

FOREIGN PATENT DOCUMENTS

| | | | | |
|---|---|---|---|---|
| CN | 112526864 A | | 3/2021 | |
| CN | 115314073 A | | 11/2022 | |
| KR | 10-2019-0002320 | | 1/2019 | |
| KR | 10-2019-0021785 | | 3/2019 | |
| KR | 10-2021-0048959 | | 5/2021 | |
| KR | 10-2021-0075834 | | 6/2021 | |
| KR | 102288542 B1 | | 8/2021 | |
| KR | 20230070432 A | | 5/2023 | |
| KR | 10-2024-0148700 | | 10/2024 | |
| WO | WO2014-130946 | * | 8/2014 | G08B 5/22 |

OTHER PUBLICATIONS

Extended European Search Report dated Jun. 24, 2026 issued in European Patent Application No. 24862955.2, 9 pp.

* cited by examiner

RING DEVICE COMPRISING ANTENNA

CROSS-REFERENCE TO RELATED APPLICATIONS

This application is a continuation of International Application No. PCT/KR2024/006832 designating the United States, filed on May 21, 2024, in the Korean Intellectual Property Receiving Office and claiming priority to Korean Patent Application Nos. 10-2023-0118016, filed on Sep. 5, 2023, and 10-2023-0143359, filed on Oct. 24, 2023, in the Korean Intellectual Property Office, the disclosures of each of which are incorporated by reference herein in their entireties.

BACKGROUND

Field

The disclosure relates to a ring device including an antenna.

Description of Related Art

Wearable devices are gaining huge popularity as they are connected to other devices, such as users' smartphone, to provide various interactions, together with a function for tracking various biometric parameters such as heart rate, sleep patterns, and activity levels. In particular, as alternative wearable form factors for wearable devices such as wristwatches, glasses, and clothing, the development of ring-type wearable devices designed for users to wear on a finger is increasing rapidly.

The above-described information may be provided as a related art for the purpose of helping to understand the present disclosure. No claim or determination is raised as to whether any of the above-described information may be applied as a prior art related to the present disclosure.

SUMMARY

According to an example embodiment, a ring device may comprise: a printed circuit board comprising an upper surface, a lower surface opposite the upper surface, and a side surface extending from an edge of the upper surface to an edge of the lower surface; a first antenna pattern formed on a first part of the side surface; a second antenna pattern formed on a second part opposite to the first part of the side surface; at least one sensor disposed on the printed circuit board; and at least one processor, comprising processing circuitry, operatively coupled to the first antenna pattern, the second antenna pattern, and the at least one sensor. At least one processor, individually and/or collectively, may be configured to determine an orientation of the ring device using the at least one sensor; and control the ring device to transmit and/or receive a radio frequency (RF) signal using any one of the first antenna pattern and the second antenna pattern, based on the determined orientation.

According to an example embodiment, a non-transitory computer-readable storage medium storing one or more programs, the one or more programs may include instructions which, when executed by at least one processor, comprising processing circuitry, of a ring device with a first antenna pattern facing a fingernail or a wrist of a user wearing the ring device, a second antenna pattern facing the wrist or the fingernail of the user wearing the ring device, and at least one sensor. The instructions, when executed by at least one processor, individually and/or collectively, may cause the ring device to: determine whether the ring device is worn by the user; in response to determining that the ring device is worn by the user, determine an antenna pattern facing the fingernail among the first antenna pattern and the second antenna pattern; determine an antenna pattern facing a direction opposite to a ground among the first antenna pattern and the second antenna pattern; and transmit and/or receive a radio frequency signal (RF signal) using the determined antenna pattern.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
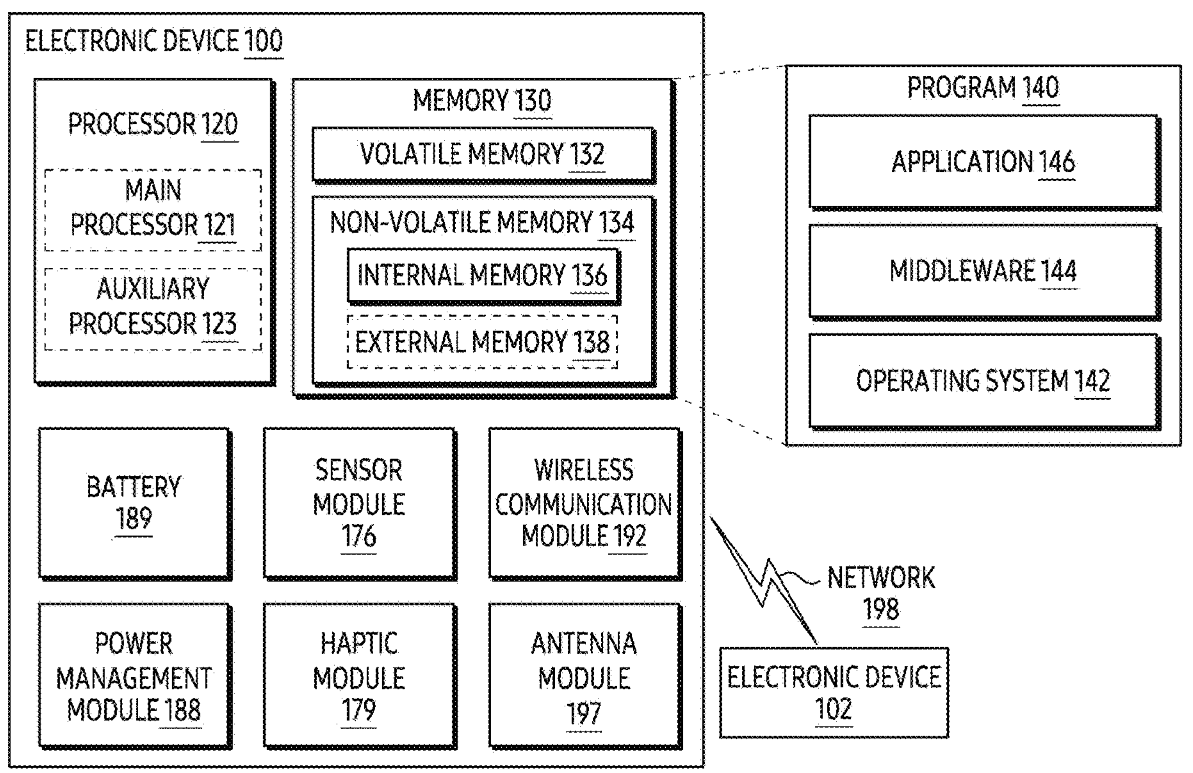
FIG. 1 is a block diagram illustrating an example electronic device in a network environment according to various embodiments.

FIG. 1 is a block diagram illustrating an example electronic device 100 in a network environment according to various embodiments. Referring to FIG. 1, the electronic device 100 in the network environment may communicate with an electronic device 102 via a network 198 (e.g., a short-range wireless communication network).

According to an embodiment, the electronic device 100 may include a processor (e.g., including processing circuitry) 120, a memory 130, a sensor module (e.g., including at least one sensor) 176, a haptic module (e.g., including haptic circuitry) 179, a power management module (e.g., including power management circuitry) 188, a battery 189, a wireless communication module (e.g., including communication circuitry) 192, and/or an antenna module (e.g., including at least one antenna) 197.

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may, for example, execute software (e.g., program 140) to control at least one other component (e.g., a hardware or software component) of the electronic device 100 connected to the processor 120, and may perform various data processing or computation. According to an embodiment, as at least part of the data processing or computation, the processor 120 may store a command or data received from another component (e.g., the sensor module 176 or the wireless communication module 192) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a communication processor (CP)) that is operable independently from, or in conjunction with, the main processor 121. For example, when the electronic device 100 includes the main processor 121 and the auxiliary processor 123, the auxiliary processor 123 may be adapted to consume less power than the main processor 121, or to be specific to a specified function. The auxiliary processor 123 may be implemented separately from, or as a part of the main processor 121.

The auxiliary processor 123 may control at least some of functions or states related to at least one component (e.g., the sensor module 176, or the wireless communication module 192) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the wireless communication module 192) functionally related to the auxiliary processor 123.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. For example, the sensor module 176 may detect the user's biometric data such as heart rate and saturation of percutaneous oxygen (SpO2), and fitness data such as step count and sleep pattern. The electronic device 100 may transmit data obtained using the sensor module 176 to the external electronic device 102 (e.g., the user's smartphone), in real time or in batches.

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a secondary cell which is rechargeable, or a fuel cell.

The wireless communication module 192 may support establishing a wireless communication channel between the electronic device 101 and the external electronic device (e.g., the electronic device 102), and performing communication via the established communication channel. The wireless communication module 192 may include one or more communication processors that are operable independently from the processor 120 (e.g., the application processor (AP)) and supports a wireless communication. According to an embodiment, the wireless communication module 192 may include a short-range wireless communication module or a global navigation satellite system (GNSS) communication module. A corresponding one of these communication modules may communicate with the external electronic device via a network (e.g., a short-range communication network, such as Bluetooth™, wireless-fidelity (Wi-Fi) direct, or infrared data association (IrDA)). These various types of communication modules may be implemented as a single component (e.g., a single chip), or may be implemented as multi components (e.g., multi chips) separate from each other.

The antenna module 197 may transmit or receive a signal or power to or from the outside (e.g., the external electronic device) of the electronic device 101. According to an embodiment, the antenna module 197 may include an antenna including a radiating element (e.g., a conductive patterns provided by a substrate (e.g., PCB)) including a conductive material or a conductive pattern.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received through the external electronic device 102 connected to the network 198, another network (e.g., a cellular network), or a server. The external electronic device 102 may be a device of a same type as, or different type (e.g., a smart phone) from, the electronic device 100. According to an embodiment, all or some of the operations executed in the electronic device 100 may be executed in one or more external electronic devices of the external electronic device 102 or a server connected to the external electronic device. According to an embodiment, all or some of operations executed in the electronic device 100 may be executed in one or more external electronic devices among the external electronic device 102 or a server connected to the external electronic device. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

Unless otherwise noted in the present disclosure, configurations having the same reference numerals may be the same as or similar to each other, and redundant descriptions of the same configurations referring to different drawings may not be repeated.

Figure 2A:
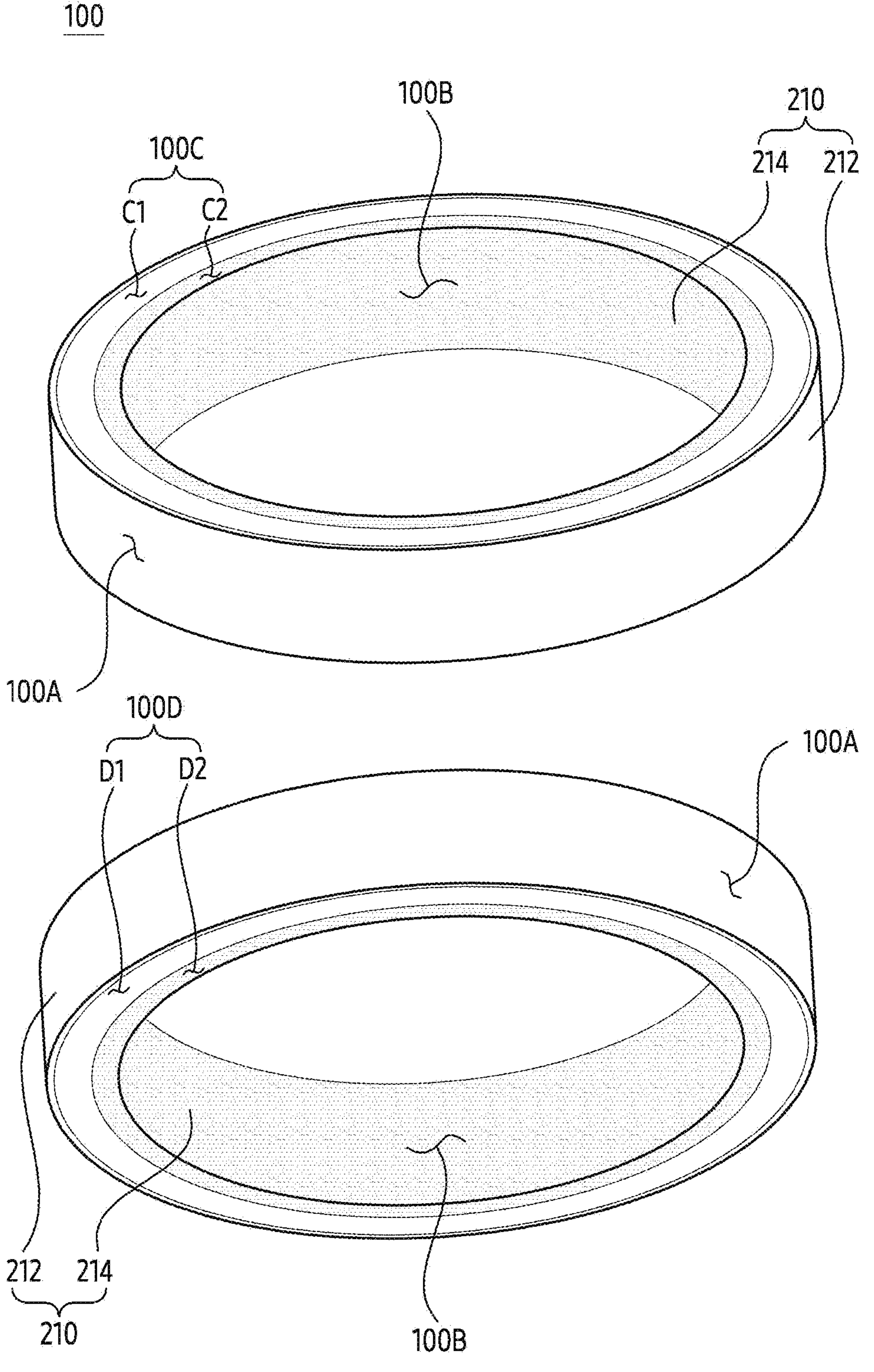
FIG. 2A includes perspective views illustrating an example ring device, according to various embodiments.

FIG. 2A includes perspective views illustrating an example ring device, according to various embodiments. Referring to FIG. 2A, according to an embodiment, a ring device 100 may include a housing 210. The housing 210 may form an exterior of the ring device 100. For example, the housing 210 may define or include a first surface 100A, a second surface 100B, a third surface 100C, and a fourth surface 100D of the ring device 100.

In an embodiment, the second surface 100B may be opposite to the first surface 100A. The second surface 100B may be a surface in contact with a body (e.g., a finger) of a user wearing the ring device 100. As a non-limiting example, the second surface 100B may be formed as a curved surface to correspond to a circumferential shape of the contacted finger. In an embodiment, the third surface 100C may extend from a portion of the first surface 100A to a portion of the second surface 100B. For example, the third surface 100C may extend from a first edge of the first surface 100A to a first edge of the second surface 100B. In an embodiment, the fourth surface 100D may extend from another portion (or a remaining portion) of the first surface 100A to another portion (or a remaining portion) of the second surface 100B. For example, the fourth surface 100D may extend from a second edge of the first surface 100A to a second edge of the second surface 100B. In an embodiment, the third surface 100C may be opposite to the fourth surface 100D. For example, the third surface 100C may face a fingernail or wrist of the user wearing the ring device 100, and the fourth surface 100D may face the user's wrist or nail.

In an embodiment, the housing 210 may include a first member (e.g., first portion) 212 and a second member (e.g., second portion) 214 coupled to the first member 212. In an embodiment, the first member 212 may form the first surface 100A of the housing 210, a first region C1 of the third surface 100C, and a first region D1 of the fourth surface 100D. The first region C1 of the third surface 100C may extend from the first edge of the first surface 100A, and the first region D1 of the fourth surface 100D may extend from the second edge of the first surface 100A. In an embodiment, the second member 214 may form the second surface 100B of the housing 210, a second region C2 of the third surface 100C, and a second region D2 of the fourth surface 100D. The second region C2 of the third surface 100C may extend from the first edge of the second surface 100B to the first region C1. The second region D2 of the fourth surface 100D may extend from the second edge of the second surface 100B to the first region D1.

As a non-limiting example, the first member 212 may include a metal. For example, at least a portion of the first member 212 may be formed of metal. As a non-limiting example, a portion of the first member 212 formed of metal may be used as an antenna radiator for transmitting and receiving a radio frequency (RF) signal. As a non-limiting example, the second member 214 may include plastic formed of a resin.

In an embodiment, the ring device 100 may be referred to as an electronic device or a wearable device.

Figure 2B:
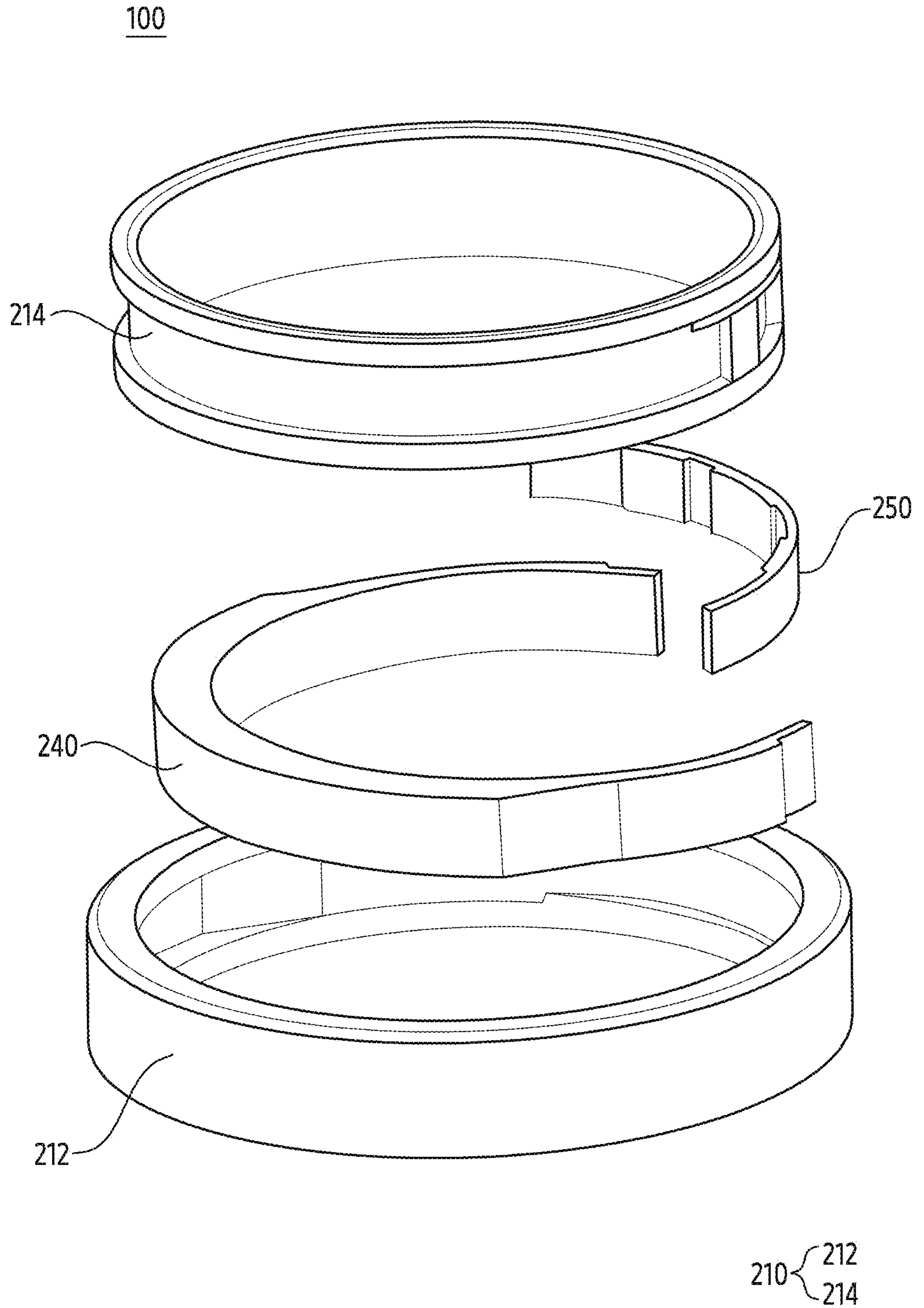
FIG. 2B is an exploded perspective view of an example ring device, according to various embodiments.

FIG. 2B is an exploded perspective view of an example ring device, according to various embodiments. Referring to FIG. 2B, according to an embodiment, the ring device 100 may include a substrate assembly 250 and a battery 240 (e.g., the battery 189 of FIG. 1).

In an embodiment, the substrate assembly 250 and the battery 240 may be located inside the housing 210. For example, the substrate assembly 250 and the battery 240 may be disposed between the first member 212 and the second member 214 of the housing 210. For example, the substrate assembly 250 and the battery 240 may be supported by being surrounded by the first member 212 and/or the second member 214. In order to correspond to a shape of the ring device 100, each of the substrate assembly 250 and the battery 240 may be provided in a shape in which at least a portion thereof is bent.

In an embodiment, the substrate assembly 250 may include at least one printed circuit board on which various components of the ring device 100 are disposed. At least one of the components illustrated in FIG. 1 may be disposed on the at least one printed circuit board. As a non-limiting example, the processor 120, the memory 130, the sensor module 176, and the wireless communication module 192 of FIG. 1 may be at least disposed on the at least one printed circuit board. When the substrate assembly 250 includes a plurality of printed circuit boards, the substrate assembly 250 may include a connection substrate connecting the plurality of printed circuit boards to each other.

Figure 3:
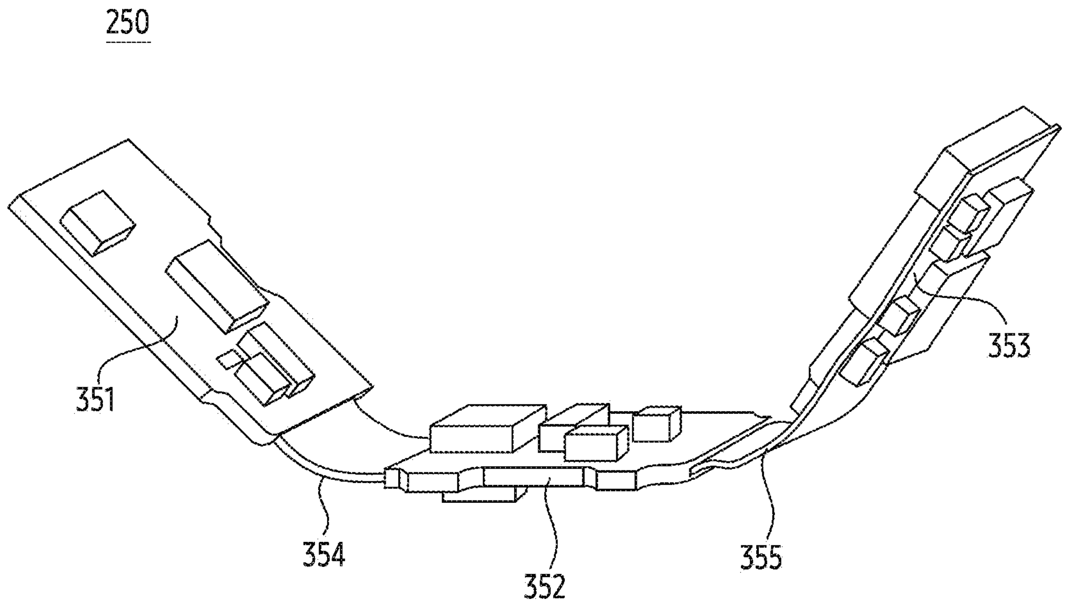
FIG. 3 is a perspective view illustrating a substrate assembly, according to various embodiments.

FIG. 3 is a perspective view illustrating a substrate assembly, according to various embodiments. Referring to FIG. 3, according to an embodiment, a substrate assembly 250 may include a first substrate 351, a second substrate 352, a third substrate 353, a first connection substrate 354, and a second connection substrate 355.

In an embodiment, each of the first substrate 351, the second substrate 352, and the third substrate 353 may include a printed circuit board. The first substrate 351, the second substrate 352, and the third substrate 353 may be formed rigidly to support various components mounted thereon.

In an embodiment, the first connection substrate 354 may connect the first substrate 351 and the second substrate 352 to each other. The second connection substrate 355 may connect the second substrate 352 and the third substrate 353 to each other. Each of the first connection substrate 354 and the second connection substrate 355 may include a flexible printed circuit board. Through the first connection substrate 354 and the second connection substrate 355, the first substrate 351, the second substrate 352, and the third substrate 353 may be arranged at different angles. Accordingly, the substrate assembly 250 may have an overall bent shape to correspond to a shape of a ring device (e.g., the ring device 100 of FIG. 2A).

Figure 4:
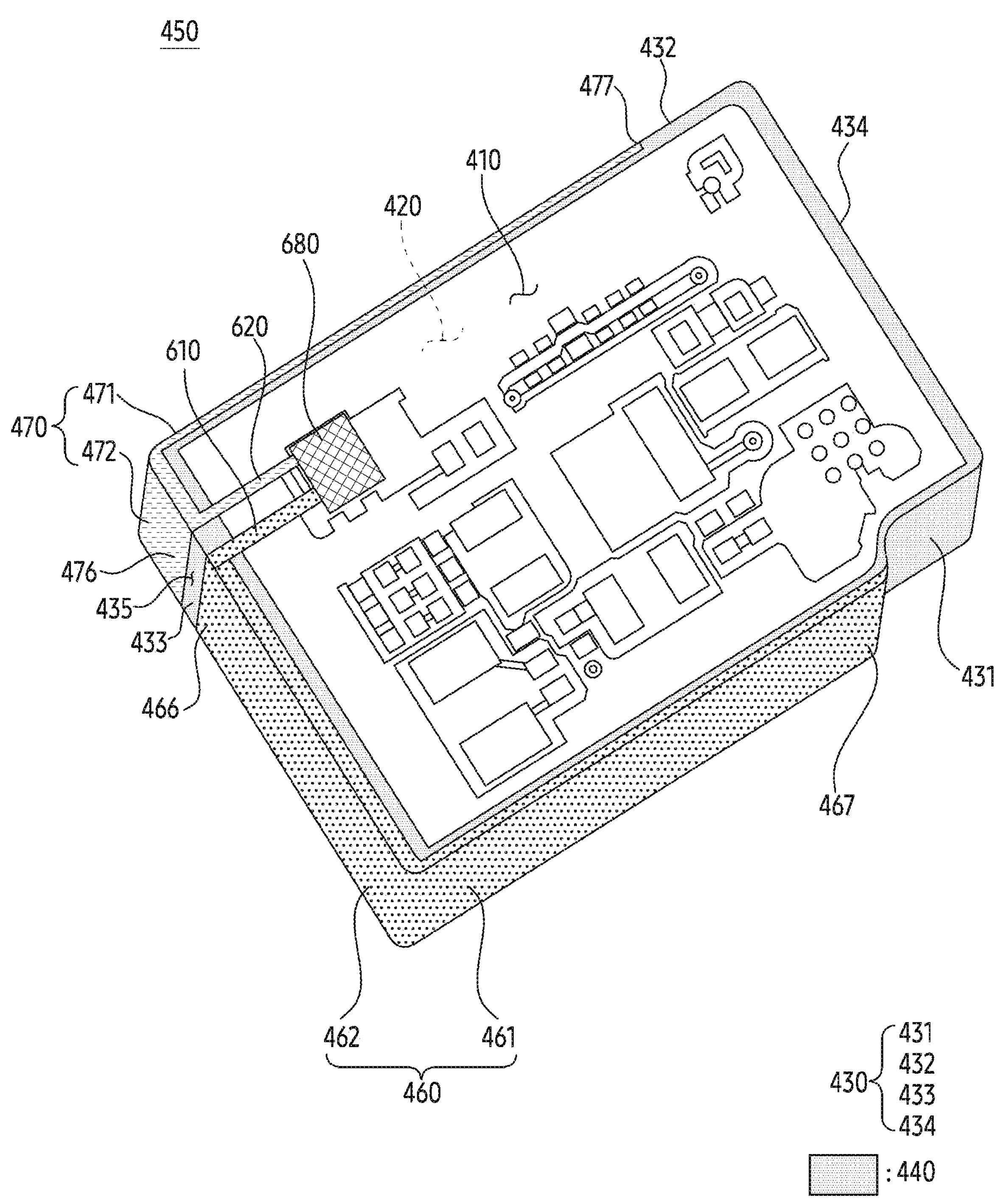
FIG. 4 is a perspective view illustrating a substrate of an example ring device, according to various embodiments.

FIG. 4 is a perspective view illustrating a substrate of an example ring device, according to various embodiments. Referring to FIG. 4, according to an embodiment, a substrate 450 (e.g., the first substrate 351, the second substrate 352, or the third substrate 353 of FIG. 3) of a ring device (e.g., the ring device 100 of FIG. 2A) may include a first surface (or upper surface) 410, a second surface (or lower surface) 420 and a third surface (or side surface) 430. The first surface 410 and the second surface 420 may face opposite directions. The third surface 430 may define a thickness of the substrate 450 by extending from an edge of the first surface 410 to an edge of the second surface 420.

In an embodiment, the third surface 430 may include a first part 431, a second part 432, a third part 433, and a fourth part 434. In an embodiment, the first part 431 may be opposite to the second part 432, and the third part 433 may be opposite to the fourth part 434. For example, the first part 431 may form a first side of the substrate 450, and the second part 432 may form a second side opposite to the first side of the substrate 450. For example, the third part 433 may form a third side of the substrate 450, and the fourth part 434 may form a fourth side opposite to the third side of the substrate 450. In an embodiment, the third part 433 may extend from one end of the first part 431 to one end of the second part 432, and the fourth part 434 may extend from another end of the first part 431 to another end of the second part 432.

In an embodiment, the ring device (or the substrate 450) may include a first antenna pattern 460 and a second antenna pattern 470. The first antenna pattern 460 and the second antenna pattern 470 may be formed at least partially on the third surface 430 of the substrate 450. The first antenna pattern 460 and the second antenna pattern 470 may be formed of a conductive material (e.g., metal). For example, the first antenna pattern 460 and the second antenna pattern 470 may be formed at least partially on the third surface 430 of the substrate 450, through a plating process.

In an embodiment, the first antenna pattern 460 may include a first section (or a first portion) 461 formed in the first part 431 of the third surface 430. Additionally, the first antenna pattern 460 may include a second section (or a second portion) 462 extending from the first section 461 and formed in the third part 433 of the third surface 430. In an embodiment, the first antenna pattern 460 may extend from a first end 466 formed in the third part 433 to a second end 467 formed in the first part 431 along the third surface 430.

In an embodiment, the second antenna pattern 470 may include a first section (or a first portion) 471 formed in the second part 432 of the third surface 430. Additionally, the second antenna pattern 470 may include a second section (or a second portion) 472 extending from the first section 471 and formed in the third part 433 of the third surface 430. In an embodiment, the second antenna pattern 470 may extend from a first end 476 formed in the third part 433 to a second end 477 formed in the second part 432 along the third surface 430.

In an embodiment, the first ends 466 and 476 of the first antenna pattern 460 and the second antenna pattern 470 may face each other and spaced apart from each other. In an embodiment, in order to form a resonant frequency corresponding to the same communication frequency band to each other, physical lengths of the first antenna pattern 460 and the second antenna pattern 470 may be substantially the same, but are not limited thereto. For example, even when the physical lengths are different from each other, the first antenna pattern 460 and the second antenna pattern 470 may form a resonance frequency corresponding to the same communication frequency band, through at least one matching circuit (e.g., at least one of a first matching circuit 710, a second matching circuit 720, and a third matching circuit 730 of FIG. 7).

In an embodiment, a remaining region of the first part 431, except for a region in which the first section 461 of the first antenna pattern 460 is formed, may be formed as a non-conductive region, but is not limited thereto. For example, the first antenna pattern 460 may extend to the remaining region of the first part 431, or another antenna pattern spaced apart from the first antenna pattern 460 may be formed in the remaining region.

In an embodiment, a remaining region of the second part 432, except for a region in which the first section 471 of the second antenna pattern 470 is formed, may be formed as a non-conductive region, but is not limited thereto. For example, the second antenna pattern 470 may extend to the remaining region of the second part 432, or another antenna pattern spaced apart from the second antenna pattern 470 may be formed in the remaining region.

In an embodiment, the third part 433 of the third surface 430 may include a non-conductive region 435 between the first antenna pattern 460 and the second antenna pattern 470. For example, the non-conductive region 435 may be located between the second section 462 of the first antenna pattern 460 and the second section 472 of the second antenna pattern 470. For example, the non-conductive region 435 may be located between the first ends 466 and 476 of the first antenna pattern 460 and of the second antenna pattern 470, which are facing each other.

In an embodiment, the substrate 450 may provide electrical paths formed of a conductive material for electrical connection between various components. For example, the substrate 450 may provide a first line 610 and a second line 620.

In an embodiment, the ring device may include a switch (or a switch circuit) 680 disposed on the substrate 450. The switch 680 may be disposed on the first surface 410 or the second surface 420 of the substrate 450. In an embodiment, the switch 680 may be electrically connected to the first antenna pattern 460 and the second antenna pattern 470, respectively. For example, the switch 680 may be electrically connected to the first antenna pattern 460 through the first line 610. For example, the switch 680 may be electrically connected to the first end 466 of the second section 462 of the first antenna pattern 460, through the first line 610. For example, the switch 680 may be electrically connected to the second antenna pattern 470 through the second line 620. For example, the switch 680 may be electrically connected to the first end 476 of the second section 472 of the second antenna pattern 470 through the second line 620. The first line 610 and the second line 620 may configure a power supply line through which a signal transmitted and received by the first antenna pattern 460 and the second antenna pattern 470 is transferred.

Although not illustrated, additionally or optionally, a shorting line connecting the first antenna pattern 460 and/or the second antenna pattern 470 to an antenna ground of the substrate 450 may be provided to the substrate 450. For example, the shorting line may be connected between the first end 466 and the second end 467 of the first antenna pattern 460 to which the first line 610 is connected. For example, the shorting line may be connected between the first end 476 and the second end 477 of the second antenna pattern 470 to which the second line 620 is connected. The first antenna pattern 460 and/or the second antenna pattern 470 to which the shorting line is connected may configure a planar inverted F shape antenna (PIFA) antenna.

In an embodiment, the substrate 450 may include a non-conductive portion 440 extending from at least a portion of the third surface 430 to the inside of the substrate 450. The non-conductive portion 440 may extend from at least the first antenna pattern 460 and the second antenna pattern 470. The first antenna pattern 460 and the second antenna pattern 470 may be spaced apart from the antenna ground of the substrate 450 by the non-conductive portion 440. As a non-limiting example, a distance where the first antenna pattern 460 and the second antenna pattern 470 are spaced apart from the antenna ground by the non-conductive portion 440 may be about 0.2 mm. In an embodiment, the non-conductive portion 440 may be referred to as a non-conductive region. The non-conductive portion 440 may be a portion (or region) from which a conductive material of the substrate 450 is removed. The non-conductive portion 440 may be referred to as a fill-cut region. The fill-cut region may be a region in which a fill (e.g., a copper fill) of a conductive material is not applied or is removed when the substrate 450 is designed.

In an embodiment, the substrate 450 may include a portion at least surrounded by the non-conductive portion 440. Various components including the switch 680 may be disposed on the portion. As a non-limiting example, the processor 120, the memory 130, and the wireless communication module 192 of FIG. 1 may be disposed on the portion. For example, the processor 120, the memory 130, and the wireless communication module 192 may be formed of a single chip, such as a microcontroller unit (MCU), but are not limited thereto.

Figure 5A:
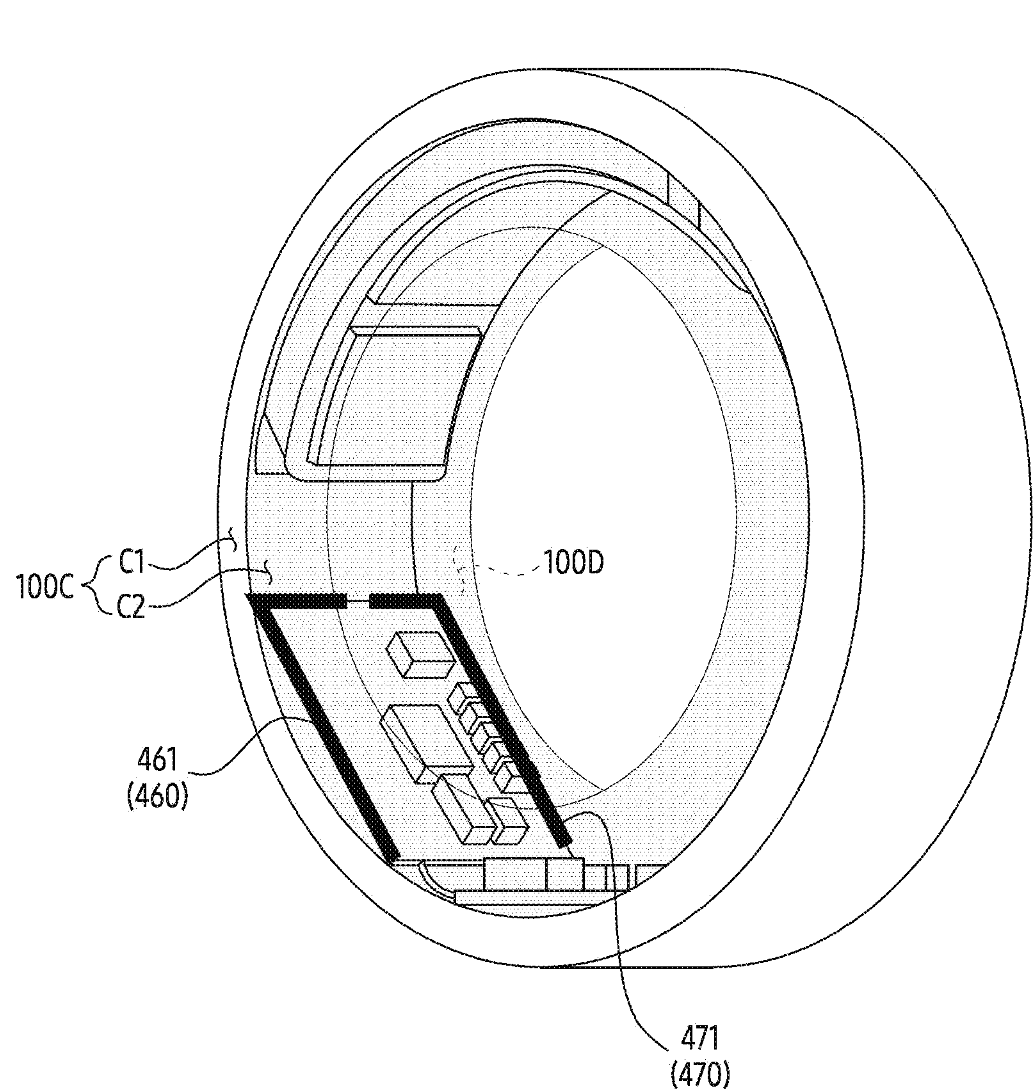
FIG. 5A is a perspective view illustrating an example ring device, according to various embodiments.
Figure 5B:
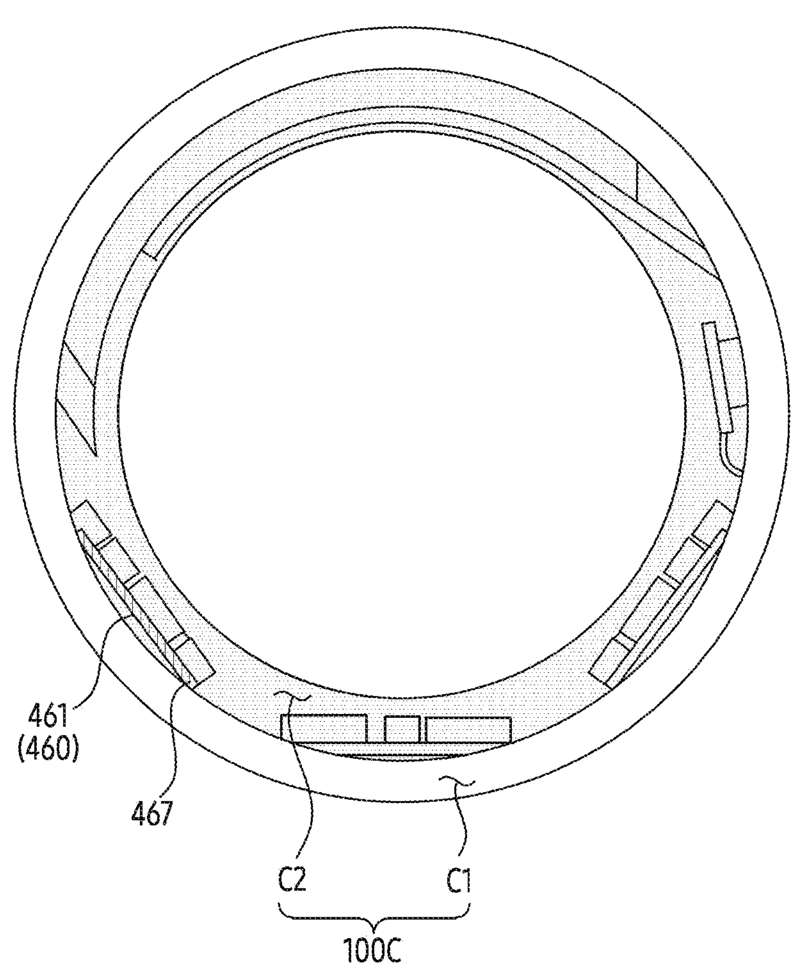
FIG. 5B is a diagram illustrating an example ring device, according to various embodiments.

FIGS. 5A and 5B include a perspective view and a diagram illustrating an example ring device, according to various embodiments.

Referring to FIG. 5A, in an embodiment, a first antenna pattern 460 may be located between a third surface 100C and a second antenna pattern 470, and a second antenna pattern 470 may be located between the first antenna pattern 460 and a fourth surface 100D.

In an embodiment, the first antenna pattern 460 may be aligned with respect to the third surface 100C, and the second antenna pattern 470 may be aligned with respect to the fourth surface 100D. In an embodiment, the first antenna pattern 460 may be arranged with respect to the third surface 100C, and the second antenna pattern 470 may be arranged with respect to the fourth surface 100D.

In an embodiment, the first antenna pattern 460 may be located on a side of the third surface 100C, and the second antenna pattern 470 may be located on a side of the fourth surface 100D. For example, the first antenna pattern 460 may be located adjacent to the third surface 100C, and the second antenna pattern 470 may be located adjacent to the fourth surface 100D. For example, the first antenna pattern 460 may be located closer to the third surface 100C than the fourth surface 100D, and the second antenna pattern 470 may be located closer to the fourth surface 100D than the third surface 100C. For example, a first section 461 of the first antenna pattern 460 may be located closer to the third surface 100C than the fourth surface 100D, and a first section 471 of the second antenna pattern 470 may be located closer to the fourth surface 100D than the third surface 100C. For example, the first antenna pattern 460 may be located closer to the third surface 100C than the second antenna pattern 470. For example, the first section 461 of the first antenna pattern 460 may be located closer to the third surface 100C than the second antenna pattern 470 (or the first section 471 of the second antenna pattern 470). For example, the second antenna pattern 470 may be located closer to the fourth surface 100D than the first antenna pattern 460. For example, the first section 471 of the second antenna pattern 470 may be located closer to the fourth surface 100D than the first antenna pattern 460 (or the first section 461 of the first antenna pattern 460).

In an embodiment, the first antenna pattern 460 may at least partially face the third surface 100C. For example, the first section 461 of the first antenna pattern 460 may face the third surface 100C. For example, the first section 461 and the third surface 100C may face each other. For example, the first section 461 of the first antenna pattern 460 may be covered by the third surface 100C (e.g., a first region C1 and/or a second region C2).

In an embodiment, the second antenna pattern 470 may at least partially face the fourth surface 100D. For example, the first section 471 of the second antenna pattern 470 may face the fourth surface 100D. For example, the first section 471 and the fourth surface 100D may face each other. For example, the first section 471 of the second antenna pattern 470 may be covered by the fourth surface 100D.

Referring to FIG. 5B, in an embodiment, the first section 461 of the first antenna pattern 460 may at least partially face the second region C2 of the third surface 100C. For example, the first section 461 of the first antenna pattern 460 may be at least partially covered by the second region C2 of the third surface 100C. Referring to FIG. 4 together, in an embodiment, the second end 467 of the first antenna pattern 460 may be covered by the second region C2, but is not limited thereto.

Although not illustrated, the description related to the first antenna pattern 460 with reference to FIG. 5B may be also applied to the second antenna pattern 470 in a corresponding manner. For example, referring to FIGS. 2A and 4 together, in an embodiment, the first section 471 of the second antenna pattern 470 may at least partially face a second region D2 of the fourth surface 100D. For example, the first section 471 of the second antenna pattern 470 may be at least partially covered by the second region D2 of the fourth surface 100D. In an embodiment, a second end 477 of the second antenna pattern 470 may be covered by the second region D2, but the disclosure is not limited thereto.

Figure 6:
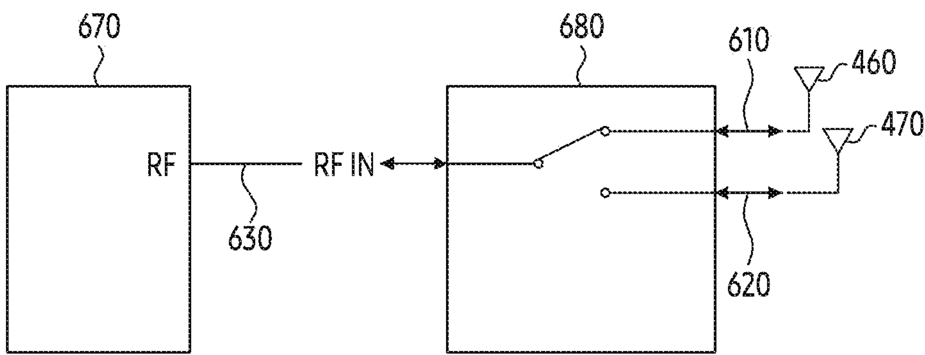
FIG. 6 is a diagram illustrating an example configuration of an example ring device, according to various embodiments.

FIG. 6 is a diagram illustrating an example configuration of an example ring device, according to various embodiments. Referring to FIG. 6, according to an embodiment, a ring device may include a radio frequency integrated circuit (RFIC) 670 (e.g., the wireless communication module 192 of FIG. 1).

In an embodiment, the RFIC 670 may include a transceiver of an RF signal. Additionally, the RFIC 670 may further include a front end module connected between the transceiver and a switch 680.

Although not illustrated, the ring device may include a modem (e.g., a communication processor of the processor 120 or a communication processor of the wireless communication module 192 of FIG. 1) for processing a signal transmitted and received by the RFIC 670. In an embodiment, the modem, the RFIC 670, the switch 680, a first antenna pattern 460, and a second antenna pattern 470 may be operatively coupled to a processor (e.g., an application processor of the processor 120 of FIG. 1) of the ring device. The processor may include at least one processor comprising processing circuitry.

In an embodiment, the RFIC 670 may be connected to the first antenna pattern 460 and the second antenna pattern 470 through a power supply line (or a transmission line). For example, the RFIC 670 may be connected to the switch 680 through a third line 630, and may be connected to the first antenna pattern 460 and the second antenna pattern 470 through a first line 610 and a second line 620 connected to the switch 680. The RFIC 670 may transmit or receive the RF signal using the first antenna pattern 460 and the second antenna pattern 470.

In an embodiment, the switch 680 may be controlled by the RFIC 670 or the modem. For example, the switch 680 may be configured to selectively connect the third line 630 to the first line 610 or the second line 620, based on a control signal provided from the RFIC 670 or the modem. Through the switch 680, the RFIC 670 may be selectively connected to the first antenna pattern 460 or the second antenna pattern 470. Accordingly, the RFIC 670 may selectively use the first antenna pattern 460 or the second antenna pattern 470 to transmit or receive the RF signal.

Figure 7:
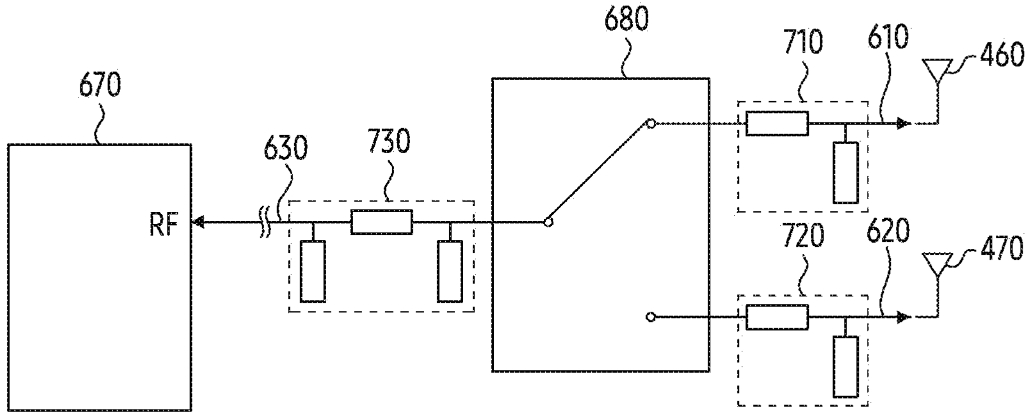
FIG. 7 is a diagram illustrating an example configuration of an example ring device, according to various embodiments.

FIG. 7 is a diagram illustrating an example configuration of an example ring device, according to various embodiments. Referring to FIG. 7, according to an embodiment, the ring device may include at least one matching circuit. For example, the at least one matching circuit may include at least one of a first matching circuit 710, a second matching circuit 720, and a third matching circuit 730. The first matching circuit 710 may be connected between a first antenna pattern 460 and a switch 680 through a first line 610. The second matching circuit 720 may be connected between a second antenna pattern 470 and the switch 680 through a second line 620. The third matching circuit 730 may be connected between an RFIC 670 and the switch 680 through a third line 630. Each of the first matching circuit 710, the second matching circuit 720, and the third matching circuit 730 may include at least one lumped element, but is not limited thereto, and various methods for impedance matching may be applied.

Figure 8:
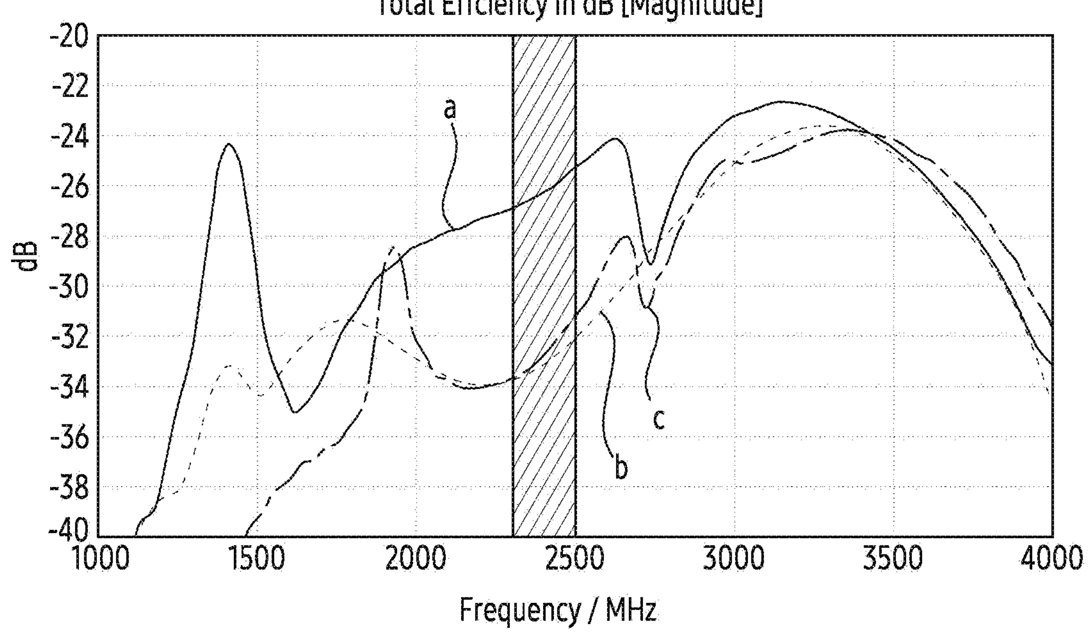
FIG. 8 is a graph illustrating radiation efficiency, according to various embodiments.

FIG. 8 is a graph illustrating radiation efficiency (e.g., total efficiency), according to various embodiments. A graph (a) of FIG. 8 illustrates radiation efficiency of a first antenna pattern 460 or a second antenna pattern 470, according to an embodiment. In comparative embodiments, a graph (b) and a graph (c) may represent radiation efficiency of a different type of antenna (e.g., chip antenna) than an antenna pattern formed on a side surface of a substrate. The graph (b) represents radiation efficiency when the chip antenna is covered by a conductive sidewall (e.g., first regions C1 and D1 of the first member 212 of FIG. 2A) of a housing, and the graph (c) represents the radiation efficiency otherwise. Referring to FIG. 8, the graph (a) according to an embodiment may have overall improved radiation efficiency than the graph (b) and the graph (c) of comparative embodiments. In particular, the graph (a) according to an embodiment may have improved radiation efficiency than the graph (b) and the graph (c) of comparative embodiments in a frequency band (e.g., Bluetooth spectrum band of 2400 MHZ to 2483.5 MHZ) for near-field wireless communication. In the chip antenna of the comparative embodiments, limitations in mounting may occur due to physical volume. A flexible printed circuit board (FPCB) antenna may be used as an alternative to the chip antenna, but the FPCB antenna may have large performance differences according to direction due to the influence of adjacent objects (e.g., human body or conductive material), and have many limitations in tuning the antenna. This decrease in antenna performance may cause a decrease in data transmission speed, an increase in current consumption, a decrease in connection distance, and a decrease in usage time when communicating between the ring device and an external device (e.g., the user's smartphone). On the other hand, according to an embodiment, improved antenna performance may be secured through antenna patterns (e.g., the first antenna pattern 460 and the second antenna pattern 470 of FIG. 7) formed on the side surface of the substrate. In addition, as described below, decrease in antenna performance due to a surrounding environment may be prevented and/or reduced by switching the antenna patterns adaptively according to a state, through a switch (e.g., the switch 680 of FIG. 7).

Figure 9:
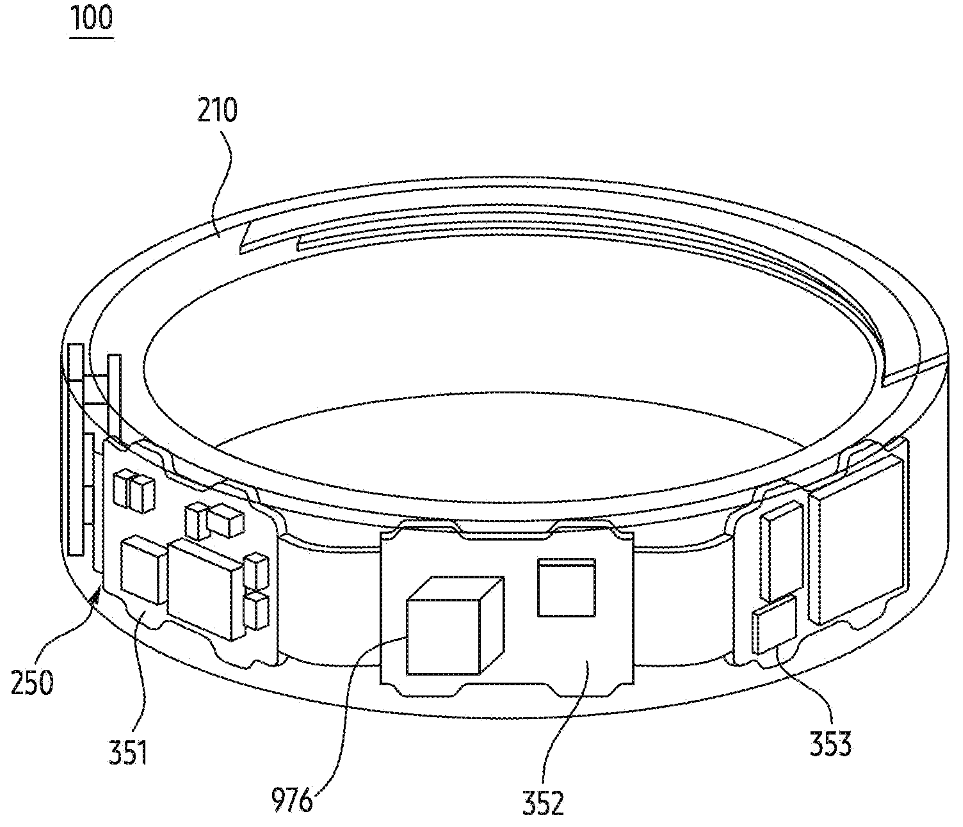
FIG. 9 is a perspective view illustrating an example ring device, according to various embodiments.

FIG. 9 is a perspective view illustrating an example ring device, according to various embodiments. Referring to FIG. 9, according to an embodiment, a ring device 100 may include at least one sensor 976 (e.g., the sensor module 176 of FIG. 1). Although it is illustrated that the at least one sensor 976 is disposed on a second substrate 352, the disclosure is not limited thereto. For example, the at least one sensor 976 may be disposed on a first substrate 351, the second substrate 352, or a third substrate 353.

Although not illustrated, the processor of the ring device 100 may be disposed on a substrate assembly 250 and may be operatively coupled to the at least one sensor 976. The processor may detect (or determine) a state of the ring device 100 using the at least one sensor 976.

Figure 10A:
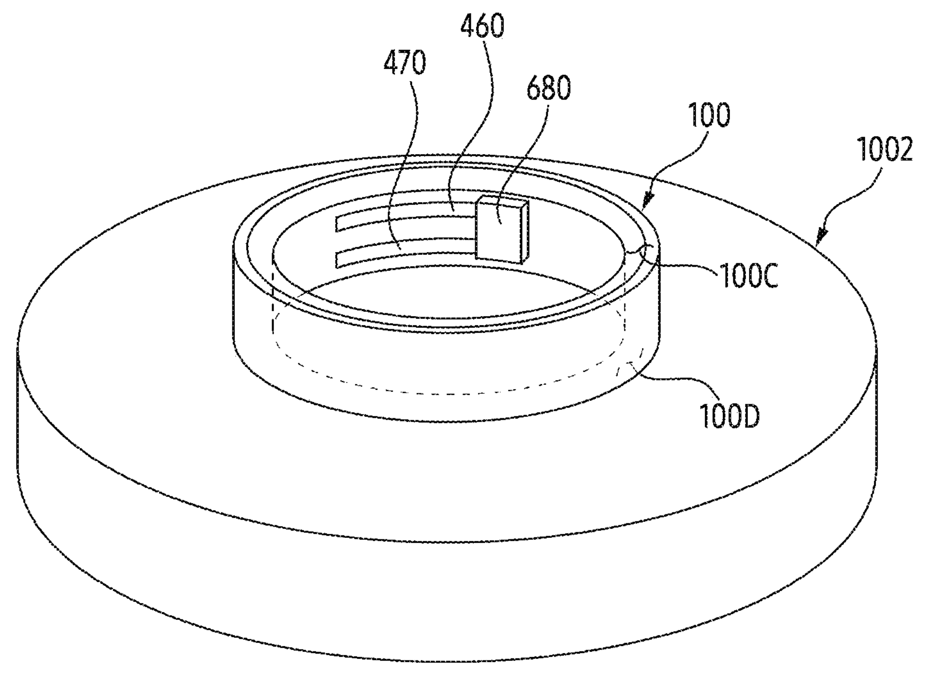
FIG. 10A is a perspective view illustrating a ring device mounted on an external device, according to various embodiments.
Figure 10B:
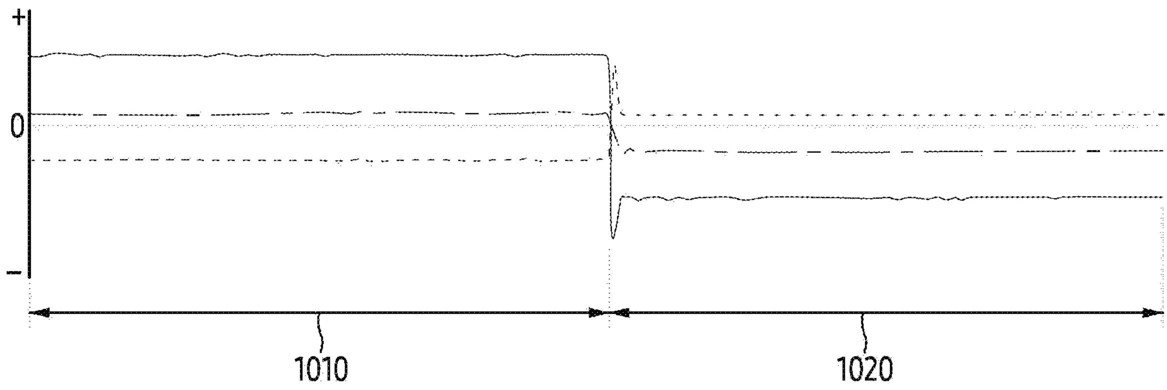
FIG. 10B is a diagram illustrating acceleration data obtained by at least one sensor, according to various embodiments.

FIG. 10A is a perspective view illustrating a ring device mounted on an external device, according to various embodiments. FIG. 10B is a diagram illustrating acceleration data obtained by at least one sensor, according to various embodiments. FIG. 10B illustrates an acceleration value (y-axis) according to time (x-axis) with respect to three axes a1, a2, and a3 that are orthogonal to each other, in a state that the ring device 100 is seated on an external device 1002. As a non-limiting example, a third axis a3 may be perpendicular to a third surface 100C (and/or a fourth surface 100D), and a first axis a1 and a second axis a2 may be perpendicular to each other and perpendicular to the third axis a3. As a non-limiting example, the third axis a3 may be an axis corresponding to a direction of gravity, in a state that the ring device 100 is seated in the external device 1002.

Referring to FIG. 10A, in an embodiment, the ring device 100 may be mounted on the external device 1002. The external device 1002 may wirelessly transmit power for charging a battery (e.g., the battery 240 of FIG. 2B) of the ring device 100 to the ring device 100. As a non-limiting example, the external device 1002 may include a transmitting coil for generating a magnetic field induced from an external power, and the ring device 100 may include a receiving coil for generating an induced current from the magnetic field.

In an embodiment, the processor may determine whether the ring device 100 is mounted on the external device 1002. For example, the processor may determine whether the ring device 100 is mounted on the external device 1002, using a value (e.g., acceleration data) obtained by the at least one sensor 976. For example, referring to FIG. 10B, when the third axis a3 indicates a largest positive acceleration value or a largest negative acceleration value, and acceleration values of the first axis a1, the second axis a2, and the third axis a3 are maintained for a specified time within a specified range, the processor may determine that the ring device 100 is being mounted on the external device 1002. However, the disclosure is not limited by the above-described example, and in order for the ring device 100 to determine whether the external device 1002 is mounted, various sensor values of the at least one sensor 976 and various algorithms for processing the sensor values may be used.

As a non-limiting example, when the ring device 100 is being wirelessly charged by the external device 1002, the processor may determine that the ring device 100 is being mounted on the external device 1002. For example, the processor may determine whether the ring device 100 is being wirelessly charged, through a signal associated with a wireless charging operation received from the external device 1002. For example, when the ring device 100 is mounted on the external device 1002, the processor may determine that the ring device 100 is being wirelessly charged in case of detecting an initial magnetic field from the external device 1002.

In an embodiment, in a state that the ring device 100 is mounted on the external device 1002, the processor may analyze sensor data by the at least one sensor 976 and determine an antenna pattern. In an embodiment, the processor may determine an orientation of the ring device 100 using the at least one sensor 976. For example, the processor may determine an antenna pattern facing a direction opposite to a ground among the first antenna pattern 460 and the second antenna pattern 470, through at least one sensor 976. For example, when the first antenna pattern 460 or the second antenna pattern 470 of the ring device 100 face a direction opposite to the ground, data in which the third axis a3 has a largest positive acceleration value, such as a first section 1010, may be obtained, and when the second antenna pattern 470 or the first antenna pattern 460 faces a direction opposite to the ground, data in which the third axis a3 has a largest negative acceleration value, such as the second section 1020, may be obtained. However, the disclosure is not limited by the above-described example, in order to determine an antenna pattern facing the direction opposite to the ground among the first antenna pattern 460 and the second antenna pattern 470, various sensor values of the at least one sensor 976 and various algorithms for processing the sensor values may be used.

The processor may transmit or receive the RF signal, using the antenna pattern determined to face the direction opposite to the ground among the first antenna pattern 460 and the second antenna pattern 470, based on the determined direction. For example, the processor may control the switch 680 so that an RFIC (e.g., the RFIC 670 of FIG. 6) is connected to the determined antenna pattern, and the RFIC may transmit or receive the RF signal using the determined antenna pattern. Through this, the antenna performance of the ring device 100 may be improved using an antenna pattern of upper end, regardless of a direction in which the ring device 100 is mounted on an external device 1002. In an embodiment, the external device 1002 may be referred to as a cradle of the ring device 100 or a wireless charging device.

Figure 11A:
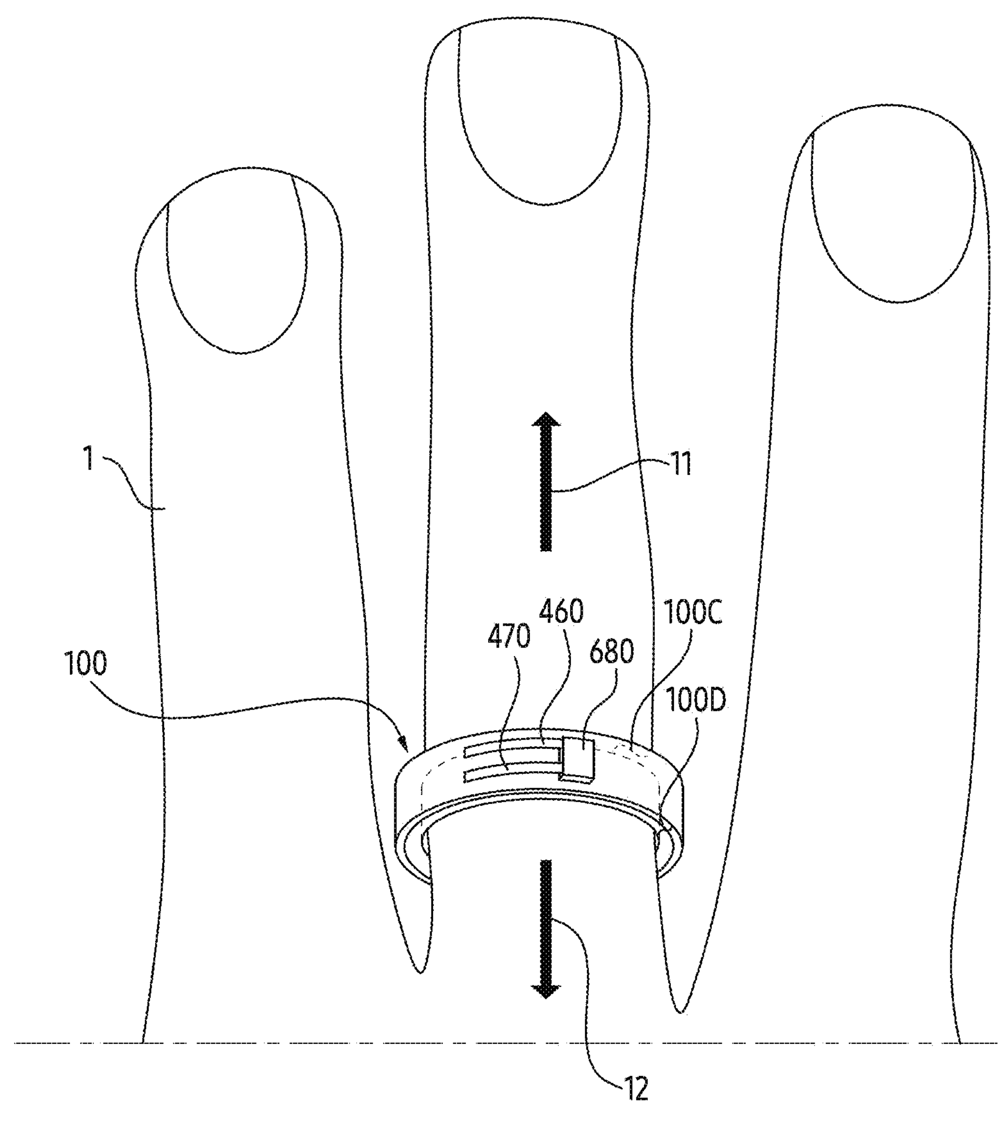
FIG. 11A is a diagram illustrating a ring device worn by a user, according to various embodiments.
Figure 11B:
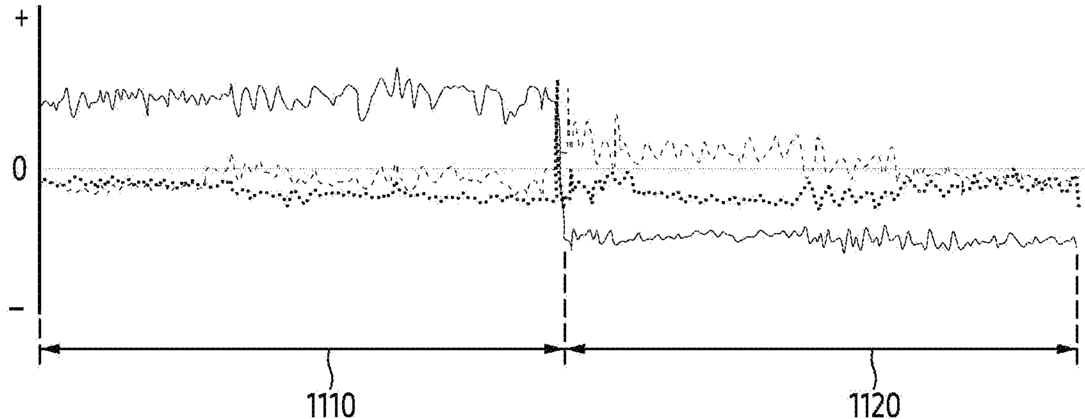
FIG. 11B is a diagram illustrating acceleration data obtained by at least one sensor, according to various embodiments.

FIG. 11A is a diagram illustrating a ring device worn by a user, according to various embodiments. FIG. 11B is a diagram illustrating acceleration data obtained by at least one sensor, according to various embodiments. FIG. 11B illustrates an acceleration value (y-axis) according to time (x-axis) with respect to three axes a1, a2, and a3 that are orthogonal to each other, in a state that the ring device 100 is worn by a user 1. As a non-limiting example, a third axis a3 may be an axis perpendicular to a third surface 100C (and/or a fourth surface 100D), and axes a1 and a2 may be two axes perpendicular to each other and perpendicular to the third axis a3. As a non-limiting example, the third axis a3 may be an axis corresponding to a fingernail direction 11 or a wrist direction 12 in a state that the ring device 100 is worn by the user 1.

Referring to FIG. 11A, in an embodiment, the ring device 100 may be worn on a finger of the user 1. In the worn state, a first antenna pattern 460 of the ring device 100 may face the fingernail direction 11 or the wrist direction 12 of the user 1, and the second antenna pattern 470 may face the wrist direction 12 or the fingernail direction 11 of the user 1.

In an embodiment, the processor may determine whether the ring device 100 is worn by the user 1. For example, the processor may determine whether the ring device 100 is worn, using a value obtained by the at least one sensor 976. As a non-limiting example, the at least one sensor 976 (e.g., a skin sensor) may detect an electrical change due to contact with the skin of the user 1, and the processor may determine that the ring device 100 is worn, in response to the detection. As a non-limiting example, the processor may detect wearing of the ring device 100, using light (e.g., infrared) transmitted and received from the at least one sensor 976 (e.g., optical sensor). However, the disclosure is not limited by the above-described example, in order to determine whether the ring device 100 is worn by the user 1, various sensor values of the at least one sensor 976 and various algorithms for processing the sensor values may be used.

In an embodiment, in a state that the ring device 100 is worn by the user 1, the processor may analyze sensor data by the at least one sensor 976 and determine the antenna pattern. In an embodiment, the processor may determine an orientation of the ring device 100 using the at least one sensor 976. For example, the processor may determine an antenna pattern facing the fingernail direction 11 among the first antenna pattern 460 and the second antenna pattern 470, through the at least one sensor 976. For example, the processor may detect various postures of the user wearing the ring device 100, using sensor data collected using the at least one sensor 976. The processor may determine an antenna pattern facing the fingernail direction 11 based on the determined posture. For example, referring to FIG. 11B, when the first antenna pattern 460 or the second antenna pattern 470 faces the fingernail direction 11 within the determined posture, acceleration data such as the first section 1110 may be obtained, and when the second antenna pattern 470 or the first antenna pattern 460 faces the fingernail direction 11 within the determined posture, acceleration data such as the second section 1120 may be obtained. However, the disclosure is not limited by the above-described example, in order to determine an antenna pattern facing the fingernail direction 11 among the first antenna pattern 460 and the second antenna pattern 470, various sensor values of the at least one sensor 976 and various algorithms for processing the sensor values may be used.

Based on the determined direction, the processor may transmit or receive the RF signal using an antenna pattern determined to face the fingernail direction 11 among the first antenna pattern 460 and the second antenna pattern 470. For example, the processor may control the switch 680 so that the RFIC is connected to the determined antenna pattern, and the RFIC may transmit or receive the RF signal using the determined antenna pattern. Through this, the antenna performance of the ring device 100 may be improved using an antenna pattern facing the fingernail direction 11, regardless of the orientation in which the ring device 100 is worn on the user 1.

Figure 12A:
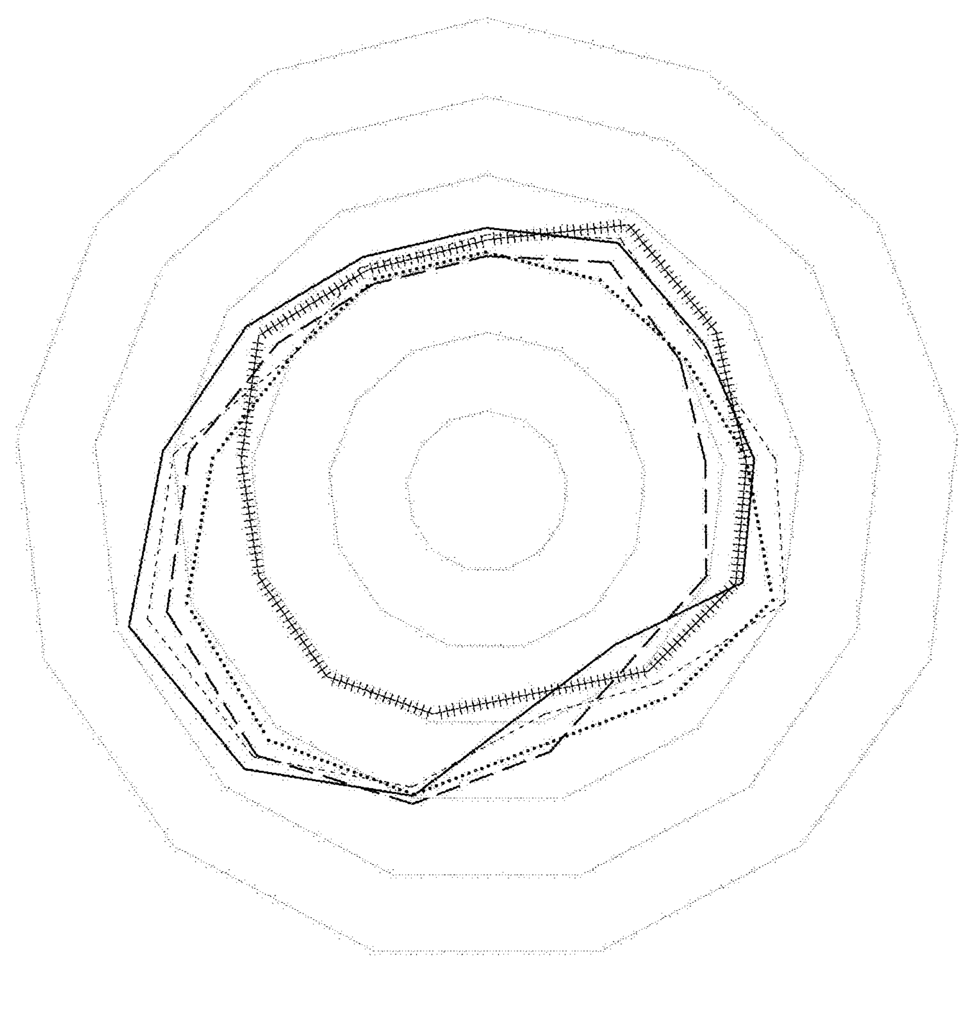
FIG. 12A is a diagram illustrating a radiation pattern of an antenna pattern, according to various embodiments.
Figure 12B:
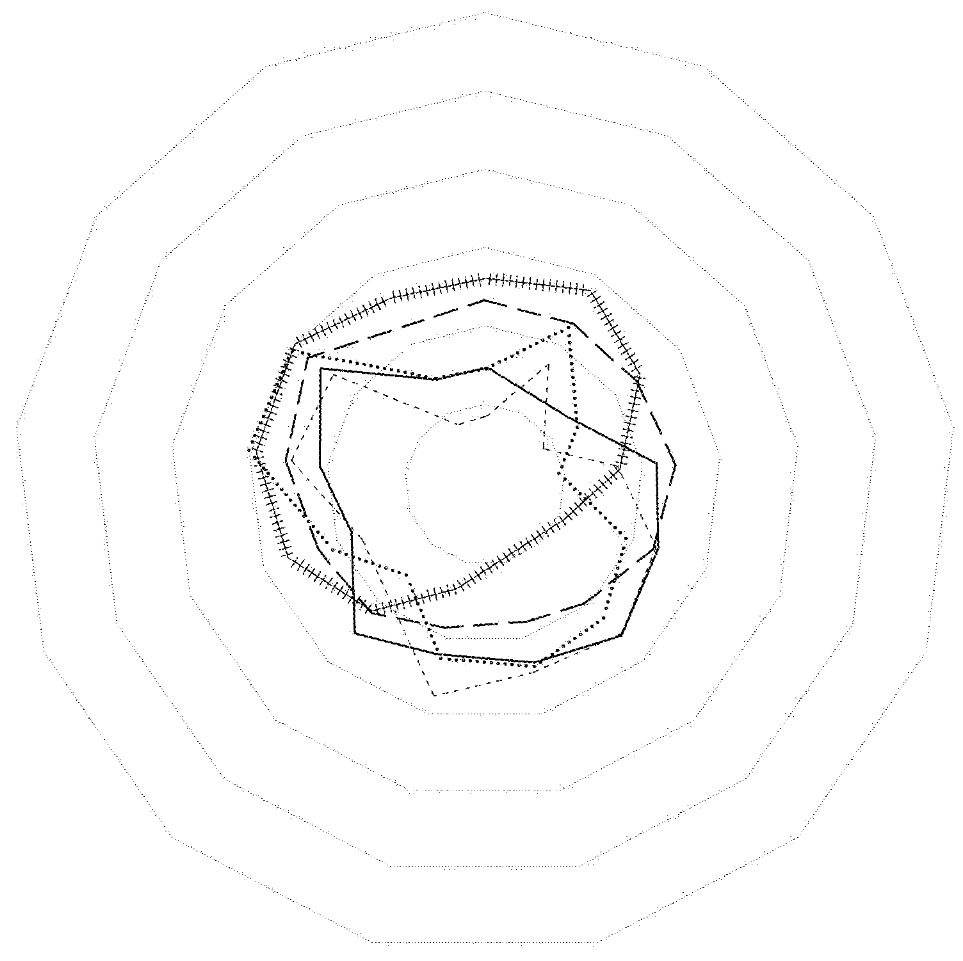
FIG. 12B is a diagram illustrating a radiation pattern of an antenna pattern, according to various embodiments.

FIGS. 12A and 12B illustrate radiation patterns of an antenna pattern according to various embodiments. FIG. 12A is a diagram illustrating a radiation pattern of an antenna pattern facing a fingernail direction (e.g., the fingernail direction 11 of FIG. 11A) according to a rotation angle, and FIG. 12B is a diagram illustrating a radiation pattern of an antenna pattern facing a wrist direction (e.g., the wrist direction 12 of FIG. 11A) according to the rotation angle. Referring to FIGS. 12A and 12B, the antenna pattern facing the fingernail direction may have higher performance than the antenna pattern facing the wrist direction. For example, the antenna pattern facing the fingernail direction may have a higher gain than the antenna pattern facing the wrist direction. In addition, for example, a radiation pattern of the antenna pattern facing the fingernail direction may be formed more evenly than a radiation pattern of the antenna pattern facing the wrist direction.

Table 1 below illustrates a total radiated power (TRP) [dBm] of the antenna pattern facing the fingernail direction and the antenna pattern facing the wrist direction.

| | | | |
|---|---|---|---|
| example 1-1 | −22.81 | −22.93 | −22.75 |
| example 1-2 | −21.37 | −21.51 | −21.10 |
| example 1-3 | −22.85 | −22.73 | −22.03 |
| example 2-1 | −27.02 | −27.07 | −26.66 |
| example 2-2 | −27.89 | −28.35 | −28.02 |
| example 2-3 | −26.89 | −27.16 | −26.35 |

Examples 1-1, 1-2, and 1-3 in Table 1 are transmission output of the antenna pattern facing the fingernail direction, and examples 2-1, 2-2, and 2-3 are transmission output of the antenna pattern facing the wrist direction. Referring to Table 1, the transmission output of the antenna pattern facing the fingernail direction may be higher than the transmission output of the antenna pattern facing the wrist direction.

This may be due to a volume of a body adjacent to the antenna pattern facing the fingernail direction being relatively smaller than a volume of the body adjacent to the antenna pattern facing the wrist direction.

Figure 13:
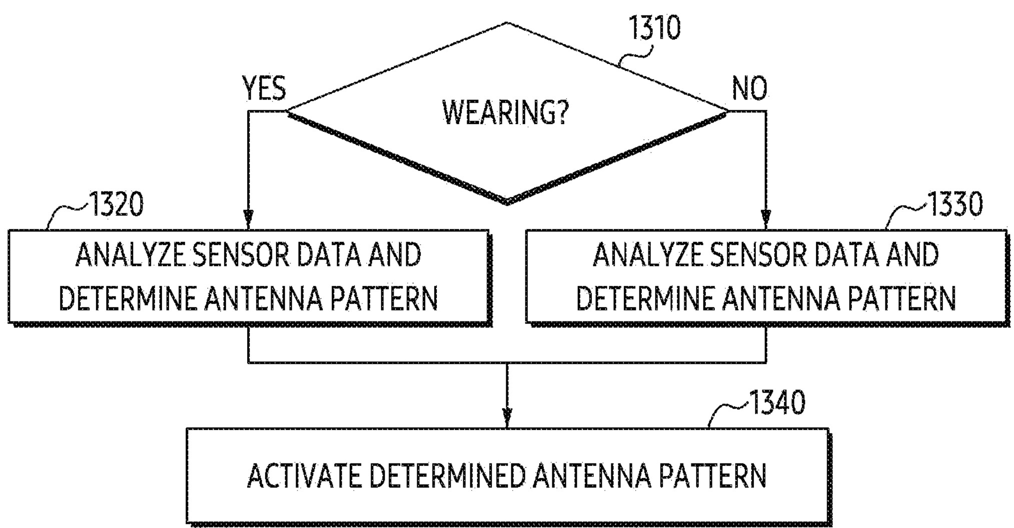
FIG. 13 is a flowchart illustrating an example method of operating a ring device, according to various embodiments.

FIG. 13 is a flowchart illustrating an example method of operating a ring device, according to various embodiments. Operations illustrated in FIG. 13 and the following drawings may be performed by the ring device (e.g., the ring device 100 of FIG. 1) or the processor (e.g., the processor 120 of FIG. 1). Operations illustrated in FIG. 13 and the following drawings may be caused by one or more instructions stored in one or more programs, when the one or more programs stored in the ring device 100 are executed by at least one processor 120. Operations illustrated in FIG. 13 and the following drawings may be performed sequentially, in parallel, or substantially simultaneously.

Referring to FIG. 13, in operation 1310, the processor may determine whether the ring device is worn by the user. The description provided with reference to FIG. 11A may be applied to operation 1310. In operation 1310, when it is determined that the ring device is worn by the user (operation 1310—YES), operation 1320 may be performed, and otherwise (operation 1310—NO), operation 1330 may be performed.

In operation 1320, the processor may analyze sensor data and determine an antenna pattern. For example, in response to determining that the user is wearing the ring device, the processor may determine an antenna pattern corresponding to a direction facing the fingernail of the user, among a first antenna pattern (e.g., the first antenna pattern 460 of FIG. 11A) and a second antenna pattern (e.g., the second antenna pattern 470 of FIG. 11A), using data obtained by at least one sensor (e.g., the at least one sensor 976 of FIG. 9). The description provided with reference to FIGS. 11A and 11B may be applied to operation 1320.

In operation 1330, the processor may analyze sensor data and determine an antenna pattern. For example, in response to determining that the ring device is not being worn by the user, the processor may determine an antenna pattern corresponding to a direction opposite to the ground, among the first antenna patterns (e.g., the first antenna pattern 460 of FIG. 10A) and the second antenna pattern (e.g., the second antenna pattern 470 of FIG. 10A), using the data obtained by the at least one sensor. The description provided with reference to FIGS. 10A and 10B may be applied to operation 1330.

In operation 1340, the processor may activate the determined antenna pattern. For example, the processor may transmit or receive the RF signal using the antenna pattern determined in operation 1320 or operation 1330. The descriptions provided with reference to FIGS. 10A, 10B, 11A, and 11B may be applied to operation 1340.

Figure 14:
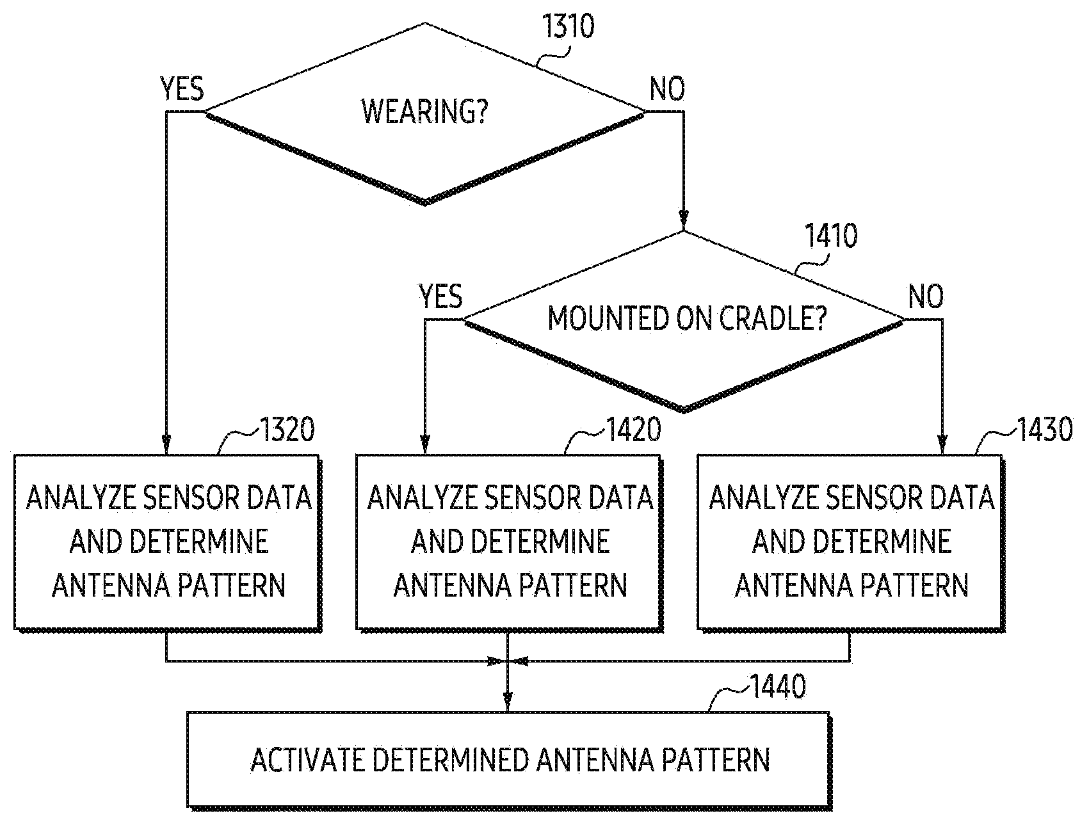
FIG. 14 is a flowchart illustrating an example method of operating a ring device, according to various embodiments.

FIG. 14 is a flowchart illustrating an example method of operating a ring device, according to an embodiment. Referring to FIG. 14, in operation 1310, when it is determined that the ring device is worn by the user (operation 1310—YES), operation 1320 may be performed, and otherwise (operation 1310—NO), operation 1410 may be performed.

In operation 1410, the processor may determine whether the ring device is mounted on a cradle (e.g., the external device 1002 of FIG. 10A). For example, in response to determining that the ring device is not being worn by the user, the processor may determine whether the ring device is mounted on the cradle of the ring device. The description provided with reference to FIGS. 10A and 10B may be applied to operation 1410. In operation 1410, when it is determined that the ring device is mounted on the cradle (operation 1410—YES), operation 1420 may be performed, otherwise (operation 1410—NO), operation 1430 may be performed.

In operation 1420, the processor may analyze sensor data and determine an antenna pattern. For example, in response to determining that the ring device is being mounted on the cradle, the processor may determine an antenna pattern corresponding to a direction opposite to the ground, among a first antenna pattern (e.g., the first antenna pattern 460 of FIG. 10A) and a second antenna pattern (e.g., the second antenna pattern 470 of FIG. 10A), using data obtained by at least one sensor. The description provided with reference to FIGS. 10A and 10B may be applied to operation 1420.

In operation 1430, the processor may analyze sensor data and determine an antenna pattern. For example, in response to determining that the ring device is not mounted on the cradle, the processor may determine an antenna pattern corresponding to the direction opposite to the ground, among the first antenna pattern and the second antenna pattern, using data obtained by the at least one sensor. The description provided with reference to FIGS. 10A and 10B may be applied in a corresponding manner with respect to operation 1430.

In operation 1440, the processor may activate the determined antenna pattern. For example, the processor may transmit and/or receive the RF signal using the antenna pattern determined in operation 1320, operation 1420, or operation 1430. The descriptions provided with reference to FIGS. 10A, 10B, 11A, and 11B may be applied to operation 1440.

In an example embodiment, a ring device (e.g., the electronic device 100 of FIG. 1) may comprise: a printed circuit board (e.g., the substrate 450 of FIG. 4) comprising an upper surface (e.g., the first surface 410 of FIG. 4), a lower surface (e.g., the second surface 420 of FIG. 4) opposite the upper surface, and a side surface (e.g., the third surface 430 of FIG. 4) extending from an edge of the upper surface to an edge of the lower surface; a first antenna pattern (e.g., the first antenna pattern 460 and/or the first section 461 of FIG. 4) formed on a first part (e.g., the first part 431 of FIG. 4) of the side surface; a second antenna pattern (e.g., the second antenna pattern 470 and/or the first section 471) of FIG. 4) formed on a second part (e.g., the second part 432 of FIG. 4) opposite to the first part of the side surface; at least one sensor (e.g., at least one sensor 976 of FIG. 9) disposed on the printed circuit board; and at least one processor, comprising processing circuitry (e.g., the processor 120 of FIG. 1), operatively coupled to the first antenna pattern, the second antenna pattern, and the at least one sensor. At least one processor, individually and/or collectively, may be configured to: determine an orientation of the ring device using the at least one sensor; and control the ring device to transmit and/or receive a radio frequency (RF) signal using any one of the first antenna pattern and the second antenna pattern, based on the determined orientation.

In an example embodiment, the ring device may comprise: a housing (e.g., the housing 210 of FIG. 2A). The housing may include a first surface (e.g., the first surface 100A of FIG. 2A); a second surface (e.g., the second surface 100B of FIG. 2A) opposite the first surface and configured to be in contact with a body of a user wearing the ring device; a third surface (e.g., the third surface 100C of FIG. 2A) extending from a first edge of the first surface to a first edge of the second surface; and a fourth surface (e.g., the fourth surface 100D of FIG. 2A) opposite to the third surface and extending from a second edge of the first surface to a second edge of the second surface. The first antenna pattern may be aligned with respect to the third surface of the housing. The second antenna pattern may be aligned with respect to the fourth surface of the housing.

A first portion (e.g., the first section 461 of FIG. 4) of the first antenna pattern may face the third surface of the housing, and a first portion (e.g., the first section 471 of FIG. 4) of the second antenna pattern may face the fourth surface of the housing.

In an example embodiment, the housing may include: a first portion (e.g., the first member 212 of FIG. 2A) and a second portion (e.g., the second member 214 of FIG. 2A) coupled to the first portion. The first portion may form the first surface of the housing and a first region (e.g., the first region C1 of FIG. 2A) of the third surface. The first region may extend from the first edge of the first surface. The second portion may form the second surface of the housing and a second region (e.g., the second region C2 in FIG. 2A) of the third surface. The second region may extend from the first edge of the second surface to the first region. The first antenna pattern may at least partially face the second region of the third surface. For example, the first portion of the first antenna pattern may at least partially face the second region of the third surface.

In an example embodiment, the first portion may form a first region (e.g., the first region D1 of FIG. 2A) of the fourth surface. The second portion may form a second region (e.g., the second region D2 of FIG. 2A) of the fourth surface. The first region of the fourth surface may extend from the second edge of the first surface. The second region of the fourth surface may extend from the second edge of the second surface to the first region of the fourth surface. The second antenna pattern may at least partially face the second region of the fourth surface. For example, the first portion of the second antenna pattern may at least partially face the second region of the fourth surface.

In an example embodiment, the first portion of the housing may include metal.

In an example embodiment, the second portion of the housing may include a non-conductive material.

In an example embodiment, the side surface of the printed circuit board may include a third part (e.g., the third part 433 of FIG. 4) extending from one end of the first part to one end of the second part. The first antenna pattern may include a first portion (e.g., the first section 461 of FIG. 4) formed on the first part, and a second portion (e.g., the second section 462 of FIG. 4) extending from the first portion and formed on the third part.

In an example embodiment, the second antenna pattern may include a first portion (e.g., the first section 471 of FIG. 4) formed on the second part, and a second portion (e.g., the second section 472 of FIG. 4) extending from the first portion of the second antenna pattern and formed on the third part.

In an example embodiment, the third part may include a non-conductive region (e.g., the non-conductive region 435 of FIG. 4) between the second portion of the first antenna pattern and the second portion of the second antenna pattern.

According to an example embodiment, the ring device may comprise: a transceiver (e.g., the RFIC 670 in FIG. 6) configured to transmit and/or receive the RF signal; a switch (e.g., the switch 680 of FIG. 6) disposed on the printed circuit board; and a feed line configured to connect the transceiver to the first antenna pattern and the second antenna pattern. The feed line may include a first line (e.g., the first line 610 of FIG. 6), a second line (e.g., the second line 620 of FIG. 6), and a third line (e.g., the third line 630 of FIG. 6) provided by the printed circuit board. The first line may be configured to connect the transceiver to the switch, the second line may be configured to connect the switch to the first antenna pattern, and the third line may be configured to connect the switch to the second antenna pattern. The switch may be configured to selectively connect the first line to the second line or the third line.

According to an example embodiment, the ring device may comprise at least one of a first matching circuit (e.g., the first matching circuit 710 of FIG. 7), a second matching circuit (e.g., the second matching circuit 720 of FIG. 7), and a third matching circuit (e.g., the third matching circuit 730 of FIG. 7). The first matching circuit may be connected to the first line; the second matching circuit may be connected to the second line; and the third matching circuit may be connected to the third line.

In an example embodiment, the first line may be connected to the second portion of the first antenna pattern, and the second line may be connected to the second portion of the second antenna pattern.

In an example embodiment, a first end (e.g., the first end 466 of FIG. 4) of the second portion of the first antenna pattern may face a second end (e.g., the first end 476 of FIG. 4) of the second portion of the second antenna pattern. The first line may be connected to the first end, and the second line may be connected to the second end.

In an example embodiment, the printed circuit board may include a non-conductive portion (e.g., the non-conductive portion 440 of FIG. 4) extending inwardly from at least a portion of the side surface.

In an example embodiment, the printed circuit board may include a portion at least partially surrounded by the non-conductive portion. At least one processor may be disposed on the portion of the printed circuit board.

In an example embodiment, in a state in which the ring device is worn by a user, the first antenna pattern or the second antenna pattern may be arranged to face the user's fingernail, and the second antenna pattern or the first antenna pattern may be arranged to face the user's wrist.

In an example embodiment, the first antenna pattern may be located closer to the third surface (e.g., the third surface 100C of FIG. 2A) than the fourth surface (e.g., the fourth surface 100D of FIG. 2A) of the housing. The second antenna pattern may be located closer to the fourth surface than the third surface of the housing.

In an example embodiment, at least one processor, individually and/or collectively, may be configured to: determine (e.g., operation 1310 of FIG. 13) whether the ring device is worn by a user, using the at least one sensor; in response to determining that the ring device is worn by the user, determine (e.g., operation 1320 of FIG. 13) an antenna pattern facing a fingernail among the first antenna pattern and the second antenna pattern; and control the ring device to transmit and/or receive (e.g., operation 1340 of FIG. 13) the RF signal using the determined antenna pattern.

In an example embodiment, at least one processor, individually and/or collectively, may be configured to, in response to determining that the ring device is not worn by the user, determine (e.g., operation 1330 of FIG. 13) an antenna pattern facing a direction opposite to a ground among the first antenna pattern and the second antenna pattern; and control the ring device to transmit and/or receive (e.g., operation 1340 of FIG. 13) the RF signal using the determined antenna pattern.

In an example embodiment, at least one processor, individually and/or collectively, may be configured to, in response to determining that the ring device is not worn by the user, determine (e.g., operation 1410 of FIG. 14) whether the ring device is mounted in a wireless charging; and in response to determining that the ring device is mounted in the wireless charging device, determine (e.g., operation 1420 of FIG. 14) an antenna pattern facing the direction opposite to the ground among the first antenna pattern and the second antenna pattern.

In an example embodiment, a non-transitory computer-readable storage medium storing one or more programs, the one or more programs may include instructions that, when executed by at least one processor, comprising processing circuitry (e.g., the processor 120 of FIG. 1) of a ring device (e.g., the electronic device 100 of FIG. 1) with a first antenna pattern (e.g., the first antenna pattern 460 of FIG. 4) facing a fingernail (e.g., the fingernail of FIG. 11A) or a wrist (e.g., the wrist of FIG. 11A) of a user wearing the ring device, a second antenna pattern facing the wrist or the fingernail of the user wearing the ring device, and at least one sensor (e.g., at least one sensor 976 of FIG. 9). The instructions, when executed by at least one processor, individually and/or collectively, may cause the ring device to: determine (e.g., operation 1310 of FIG. 13) whether the ring device is worn by the; in response to determining that the ring device is worn by the user, determine (e.g., operation 1320 of FIG. 13) an antenna pattern facing the fingernail among the first antenna pattern and the second antenna pattern; in response to determining that the ring device is not worn by the user, determine (e.g., operation 1330 of FIG. 13) an antenna pattern facing a direction opposite to a ground among the first antenna pattern and the second antenna pattern; and transmit and/or receive (e.g., operation 1340 of FIG. 13) a radio frequency signal (RF signal) using the determined antenna pattern.

The instructions, when executed by at least one processor, individually and/or collectively, may cause the ring device to, in response to determining that the ring device is not worn by the user, determine (e.g., operation 1410 of FIG. 14) whether the ring device is mounted in a wireless charging device.

The instructions, when executed by at least one processor, individually and/or collectively, may cause the ring device to, in response to determining that the ring device is mounted in the wireless charging device, determine (e.g., operation 1420 of FIG. 14) an antenna pattern facing the direction opposite to the ground among the first antenna pattern and the second antenna pattern.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and docs not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 100). For example, a processor (e.g., the processor 120) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term docs not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A ring device comprising:

a printed circuit board comprising an upper surface, a lower surface opposite the upper surface, and a side surface extending from an edge of the upper surface to an edge of the lower surface;

a first antenna pattern formed on a first part of the side surface;

a second antenna pattern formed on a second part opposite to the first part of the side surface, the first antenna pattern and the second antenna pattern being electrically separate antenna structures;

at least one sensor disposed on the printed circuit board; and at least one processor, comprising processing circuitry, operatively coupled to the first antenna pattern, the second antenna pattern, and the at least one sensor, and wherein at least one processor, individually and/or collectively, is configured to:

determine an orientation of the ring device using the at least one sensor; and select, based on the determined orientation, one of the first antenna pattern and the second antenna pattern to transmit and/or receive a radio frequency (RF) signal.

2. The ring device of claim 1, comprising a housing including:

a first surface;

a second surface opposite the first surface and configured to be in contact with a body of a user wearing the ring device;

a third surface extending from a first edge of the first surface to a first edge of the second surface; and a fourth surface opposite to the third surface and extending from a second edge of the first surface to a second edge of the second surface, and wherein:

the first antenna pattern is aligned with respect to the third surface of the housing; and the second antenna pattern is aligned with respect to the fourth surface of the housing.

3. The ring device of claim 2, wherein:

the housing comprises a first portion and a second portion coupled to the first portion;

the first portion forms the first surface of the housing and a first region of the third surface;

the first region extends from the first edge of the first surface;

the second portion forms the second surface of the housing and a second region of the third surface;

the second region extends from the first edge of the second surface to the first region; and the first antenna pattern at least partially faces the second region of the third surface.

4. The ring device of claim 3, wherein:

the first portion forms a first region of the fourth surface;

the second portion forms a second region of the fourth surface;

the first region of the fourth surface extends from the second edge of the first surface;

the second region of the fourth surface extends from the second edge of the second surface to the first region of the fourth surface;

the second antenna pattern at least partially faces the second region of the fourth surface.

5. The ring device of claim 3, wherein the first portion comprises metal.

6. The ring device of claim 3, wherein the second portion comprises a non-conductive material.

7. The ring device of claim 2, wherein:

the first antenna pattern is located closer to the third surface than the fourth surface of the housing; and the second antenna pattern is located closer to the fourth surface than the third surface of the housing.

8. The ring device of claim 1, wherein:

the side surface of the printed circuit board includes a third part extending from one end of the first part to one end of the second part;

the first antenna pattern includes:

a first portion formed on the first part; and a second portion extending from the first portion and formed on the third part.

9. The ring device of claim 8, wherein the second antenna pattern includes:

a first portion formed on the second part; and a second portion extending from the first portion of the second antenna pattern and formed on the third part.

10. The ring device of claim 9, wherein the third part includes a non-conductive region between the second portion of the first antenna pattern and the second portion of the second antenna pattern.

11. The ring device of claim 8, comprising:

a transceiver configured to transmit and/or receive the RF signal;

a switch disposed on the printed circuit board; and a feed line configured to connect the transceiver to the first antenna pattern and the second antenna pattern, and wherein:

the feed line includes a first line, a second line, and a third line provided by the printed circuit board;

the first line connects the transceiver to the switch;

the second line connects the switch to the first antenna pattern;

the third line connects the switch to the second antenna pattern; and the switch is configured to selectively connect the first line to the second line or the third line.

12. The ring device of claim 11, comprising at least one of a first matching circuit, a second matching circuit, and a third matching circuit, and wherein:

the first matching circuit is connected to the first line;

the second matching circuit is connected to the second line;

the third matching circuit is connected to the third line.

13. The ring device of claim 11, wherein:

the first line is connected to the second portion of the first antenna pattern; and the second line is connected to the second portion of the second antenna pattern.

14. The ring device of claim 13, wherein:

a first end of the second portion of the first antenna pattern faces a second end of the second portion of the second antenna pattern;

the first line is connected to the first end;

the second line is connected to the second end.

15. The ring device of claim 1, wherein the printed circuit board includes a non-conductive portion extending inwardly from at least a portion of the side surface.

16. The ring device of claim 15, wherein:

the printed circuit board includes a portion at least partially surrounded by the non-conductive portion; and at least one processor is disposed on the portion of the printed circuit board.

17. The ring device of claim 1, wherein at least one processor, individually and/or collectively, is configured to:

using the at least one sensor, determine whether the ring device is worn by a user;

in response to determining that the ring device is worn by the user, determine an antenna pattern facing a fingernail of the user among the first antenna pattern and the second antenna pattern; and control the ring device to transmit and/or receive the RF signal using the determined antenna pattern.

18. The ring device of claim 17, wherein at least one processor, individually and/or collectively, is configured to:

in response to determining that the ring device is not worn by the user, determine an antenna pattern facing a direction opposite to a ground among the first antenna pattern and the second antenna pattern; and control the ring device to transmit and/or receive the RF signal using the determined antenna pattern.

19. The ring device of claim 1, wherein at least one processor, individually and/or collectively, is configured to:

in response to determining that the ring device is not worn by the user, determine whether the ring device is mounted in a wireless charging device; and in response to determining that the ring device is mounted in the wireless charging device, determine an antenna pattern facing the direction opposite to the ground among the first antenna pattern and the second antenna pattern.

20. A non-transitory computer-readable storage medium storing one or more programs, the one or more programs including one or more instructions that, when executed by at least one processor, comprising processing circuitry, individually and/or collectively, of a ring device with a first antenna pattern facing a fingernail or a wrist of a user wearing the ring device, a second antenna pattern facing the wrist or the fingernail of the user wearing the ring device, and at least one sensor, cause the ring device to:

determine whether the ring device is worn by the user;

in response to determining that the ring device is worn by the user, determine an antenna pattern facing the fingernail among the first antenna pattern and the second antenna pattern;

in response to determining that the ring device is not worn by the user, determine an antenna pattern facing a direction opposite to a ground among the first antenna pattern and the second antenna pattern; and transmit and/or receive a radio frequency signal (RF signal) using the determined antenna pattern.

* * * * *